(12) United States Patent
Geltinger

(10) Patent No.: US 10,953,589 B2
(45) Date of Patent: Mar. 23, 2021

(54) CHANGING BLOW MOULDS IN BLOW-MOULDING MACHINES

(71) Applicant: KRONES AG, Neutraubling (DE)

(72) Inventor: Florian Geltinger, Donaustauf (DE)

(73) Assignee: KRONES AG, Neutraubling (DE)

( * ) Notice: Subject to any disclaimer, the term of this patent is extended or adjusted under 35 U.S.C. 154(b) by 47 days.

(21) Appl. No.: 15/753,857

(22) PCT Filed: Dec. 19, 2016

(86) PCT No.: PCT/EP2016/081813
§ 371 (c)(1),
(2) Date: Feb. 20, 2018

(87) PCT Pub. No.: WO2017/103287
PCT Pub. Date: Jun. 22, 2017

(65) Prior Publication Data
US 2018/0281265 A1    Oct. 4, 2018

(30) Foreign Application Priority Data

Dec. 18, 2015 (DE) ...................... 10 2015 122 290.6

(51) Int. Cl.
*B29C 49/48* (2006.01)
*B29C 49/30* (2006.01)
(Continued)

(52) U.S. Cl.
CPC .............. *B29C 49/30* (2013.01); *B29C 49/06* (2013.01); *B29C 49/4205* (2013.01);
(Continued)

(58) Field of Classification Search
CPC ...................... B29C 2049/4858; B29C 31/006
See application file for complete search history.

(56) References Cited

U.S. PATENT DOCUMENTS 9,004,905 B2   4/2015   Humele et al.
9,227,345 B2   1/2016   Cirette et al.
(Continued)

FOREIGN PATENT DOCUMENTS

CN   101856869   10/2010
CN   104321183   1/2015
(Continued)

OTHER PUBLICATIONS

Chinese Office Action dated May 22, 2019 issued in corresponding Chinese Application No. 201680050567.7 with English translation.
(Continued)

*Primary Examiner* — Robert B Davis
(74) *Attorney, Agent, or Firm* — Onello & Mello, LLP

(57) ABSTRACT

A method for operating a forming device for forming plastic preforms into plastic containers, wherein in a working mode of the apparatus, the plastic preforms are transported by means of a plurality of forming stations along a predefined transport path, and by loading with a fluid medium are expanded into plastic containers, wherein to expand the plastic preforms, blow-moulding devices are used, inside which the plastic preforms are expanded into plastic containers, wherein in a change mode, at least one of the blow-moulding devices is removed from the apparatus and/or one of the blow-moulding devices is arranged on a blow-mould carrier of the apparatus, wherein to change the blow-moulding devices, a change device is used which has a gripper device for gripping the blow-moulding device. According to the invention, in a working mode, the forming device is operated in a first protected area which is not accessible to a machine operator, and the change device is arranged at least partially in a second protected area which is accessible for the machine operator for at least part of the time in working mode, wherein a connection can be created (Continued)

Figure 3:
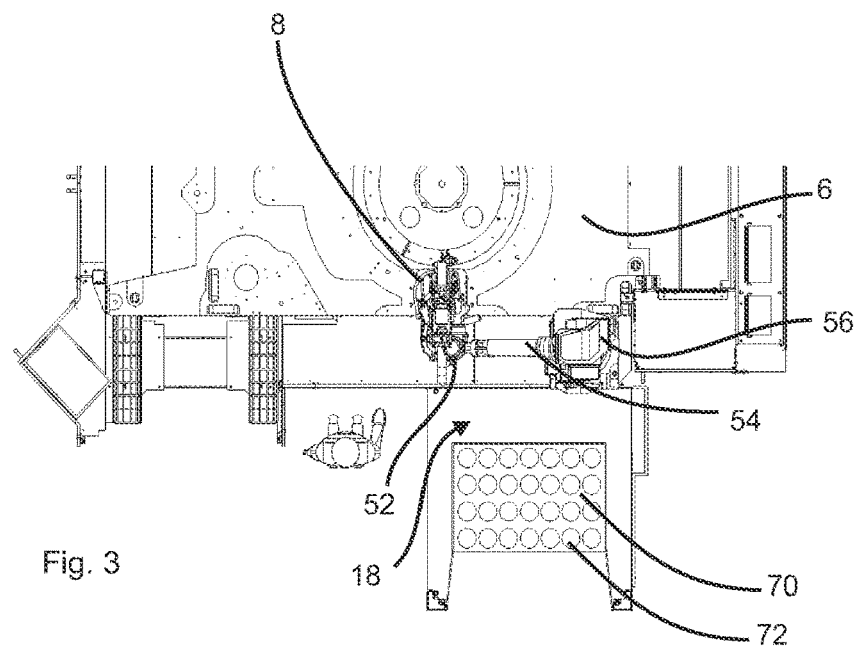

between the first protected area and the second protected area.

16 Claims, 11 Drawing Sheets

(51) Int. Cl.
    *B29C 49/06*     (2006.01)
    *B29C 49/42*     (2006.01)
    *B29L 31/00*     (2006.01)
    *B29C 49/00*     (2006.01)
    *B29C 49/46*     (2006.01)
    *B29K 105/00*     (2006.01)
    *B29C 49/36*     (2006.01)

(52) U.S. Cl.
    CPC .............. *B29C 49/48* (2013.01); *B29C 49/36* (2013.01); *B29C 2049/0094* (2013.01); *B29C 2049/4694* (2013.01); *B29C 2049/4858* (2013.01); *B29C 2049/4892* (2013.01); *B29K 2105/253* (2013.01); *B29L 2031/712* (2013.01)

(56) References Cited

U.S. PATENT DOCUMENTS

| | | |
|---|---|---|
| 9,527,233 B2 | 12/2016 | Winzinger |
| 9,873,222 B2 | 1/2018 | Blochmann |
| 9,925,712 B2 | 3/2018 | Finger et al. |
| 10,000,027 B2 | 6/2018 | Voth et al. |
| 2011/0052744 A1* | 3/2011 | Meinzinger ............. B29C 49/36 425/183 |
| 2012/0100238 A1 | 4/2012 | Humele et al. |
| 2014/0305076 A1 | 10/2014 | Winzinger |
| 2015/0145178 A1 | 5/2015 | Blochmann |
| 2015/0145179 A1 | 5/2015 | Finger et al. |
| 2015/0151455 A1 | 6/2015 | Cirette et al. |
| 2015/0251366 A1 | 9/2015 | Voth et al. |
| 2015/0367555 A1 | 12/2015 | Winzinger |
| 2017/0182679 A1 | 6/2017 | Winzinger |

FOREIGN PATENT DOCUMENTS

| | | | |
|---|---|---|---|
| CN | 104494116 | 4/2015 | |
| CN | 104760262 | 7/2015 | |
| CN | 104936761 | 9/2015 | |
| DE | 102009015522 | 10/2010 | |
| DE | 102010049385 | 4/2012 | |
| DE | 102014103159 | 9/2015 | |
| EP | 2468478 A1 * | 6/2012 | ........... B29C 31/006 |
| EP | 2711158 | 3/2014 | |
| EP | 2918391 | 9/2015 | |
| WO | 2013060549 | 5/2013 | |

OTHER PUBLICATIONS

Chinese Search Report dated May 10, 2019 issued in corresponding Chinese Application No. 201680050567.7, with English translation.
International Search Report dated Mar. 20, 2017 issued in corresponding International Application No. PCT/EP2016/081813.
German Search Report dated Aug. 31, 2016 issued in corresponding German Application No. 102015122290.6.
European Office Action dated Feb. 5, 2020 issued in corresponding European Application No. 16813243.9.

* cited by examiner

Fig. 1
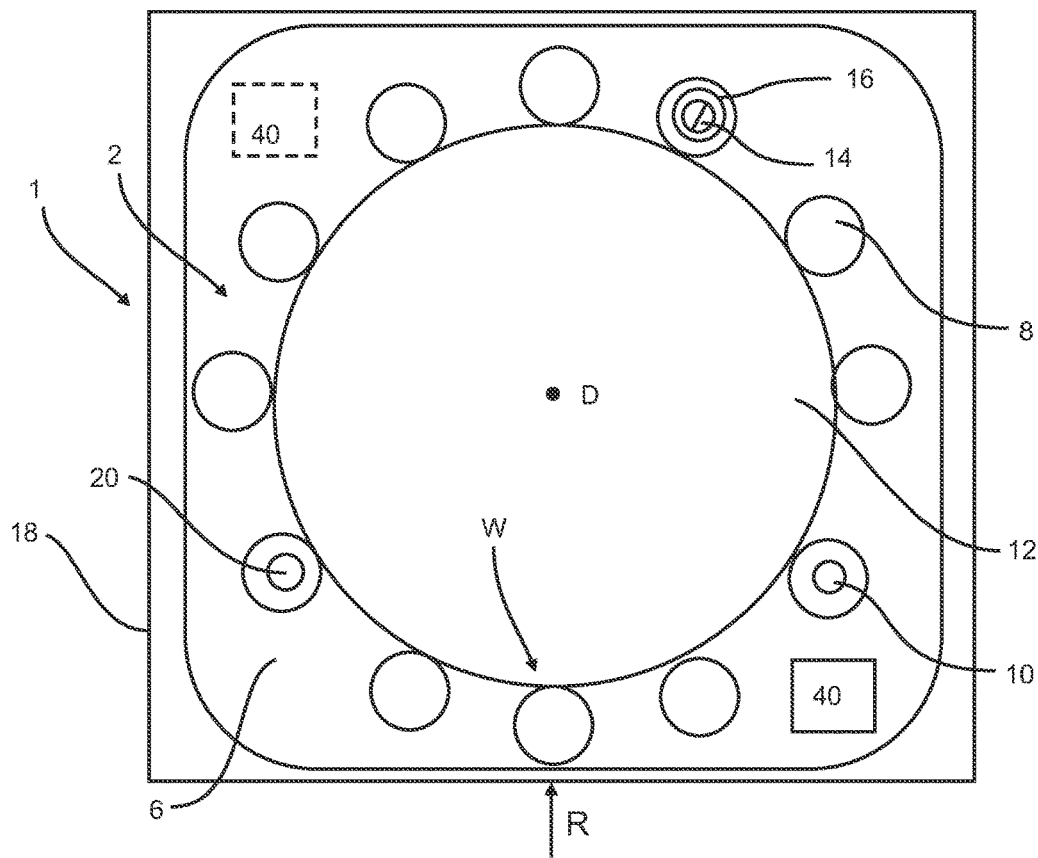
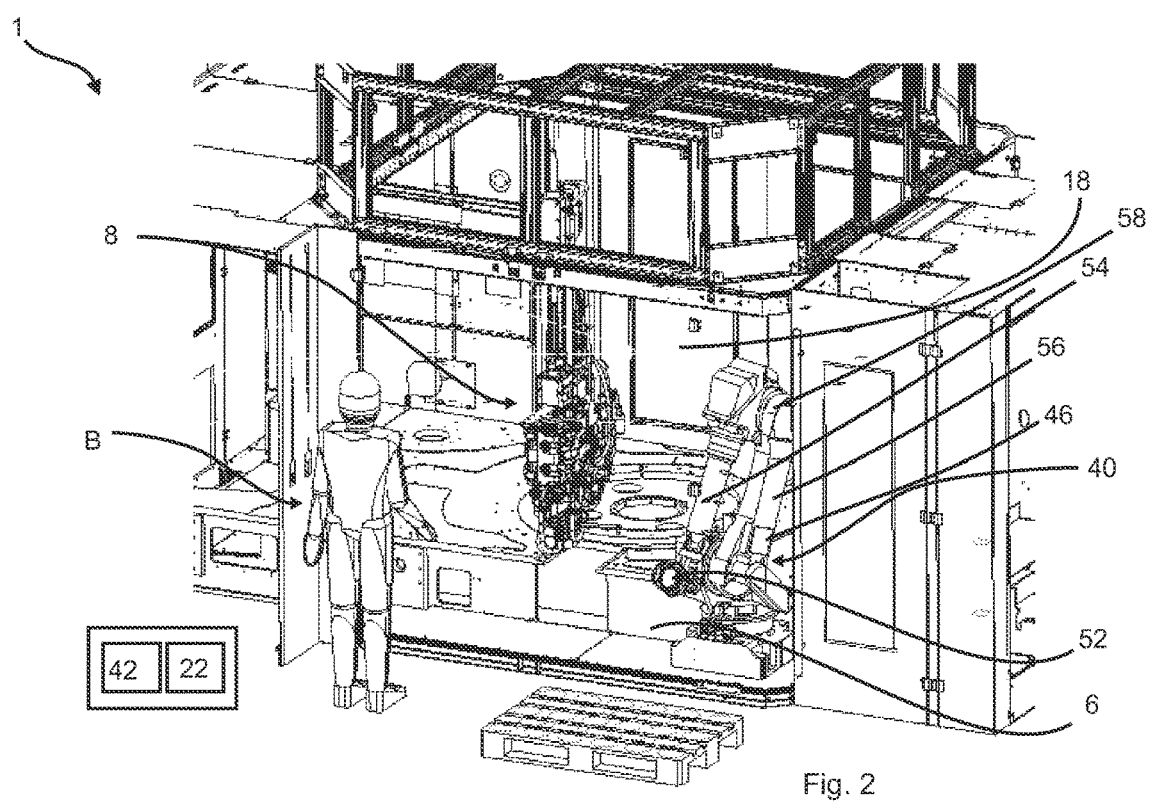
Fig. 2

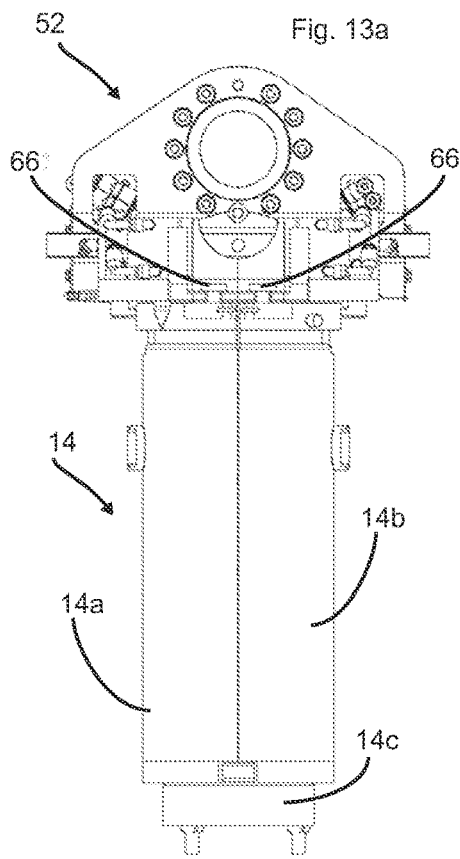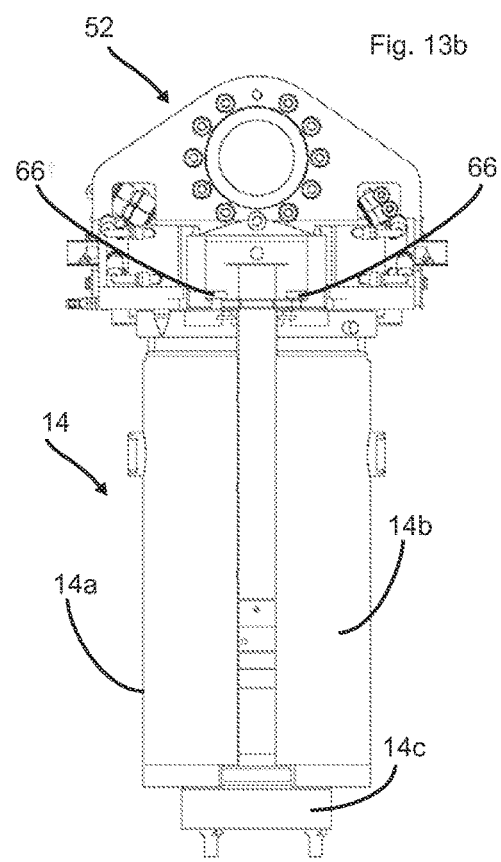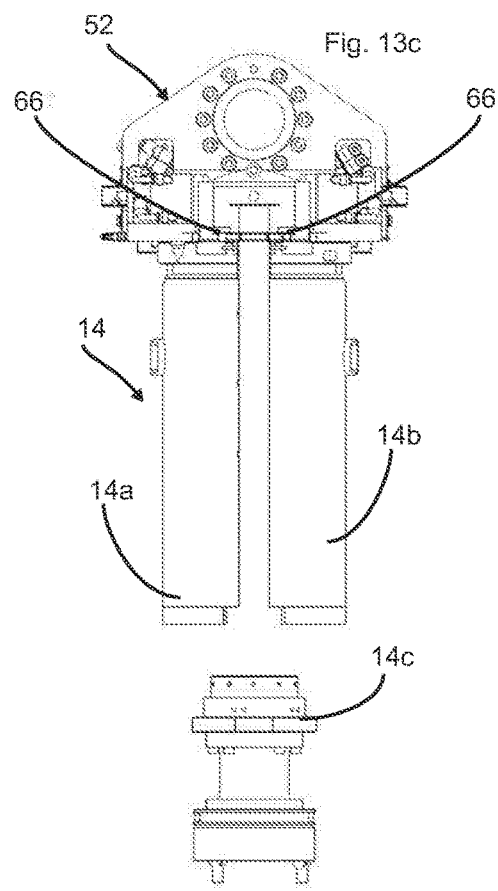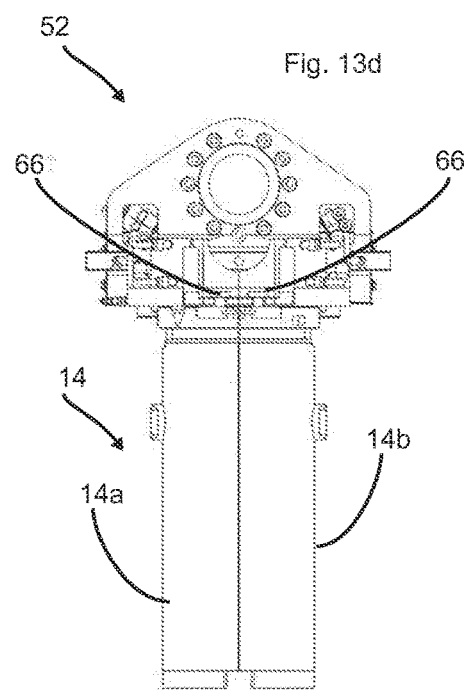

CHANGING BLOW MOULDS IN BLOW-MOULDING MACHINES

The present invention concerns a method for operating a forming apparatus and in particular for changing blow moulds of this forming device for forming plastic preforms into plastic containers. In addition, the invention also concerns a corresponding apparatus for forming plastic preforms into plastic containers.

Such devices have been known from the prior art for a long time. Here, heated plastic preforms are formed into plastic containers, such as plastic bottles, usually by loading with air pressure. To this end, normally a plurality of forming stations or blowing stations are arranged on a rotatable carrier. These blowing stations each comprise blow moulds which in turn have a cavity within which the plastic preforms are formed into the plastic containers. These blow moulds comprise a negative of the container to be produced. If the apparatus must be converted to other containers, the individual blow moulds must be exchanged. In the prior art, these blow moulds are removed individually from the respective forming stations. An operator removes the individual blow-moulding devices and replaces them with new blow-moulding devices which will form the corresponding new containers. Therefore the exchange process takes a relatively long time and also an operator is required.

Recently, also change devices have been known which allow partly or fully automatic changing of blow moulds. For example, blow moulds to be inserted are provided via a magazine, and a robot removes a previous blow mould and in its place inserts a new blow mould in the respective forming station. Thus for example, the blow moulds to be inserted are extracted successively from the magazine. In the prior art, the blow moulds are not checked. It may occur that an incorrect blow mould is inserted, or faults may occur if the operator has not properly loaded a replacement pallet and these blow moulds are therefore sitting wrongly in a corresponding replacement pallet. A check is performed after production has stopped on a blow-moulding machine. These check times are added to the change times, which leads to a longer production stoppage.

The present invention is therefore based on the object of making such changing of blow moulds in blow-moulding machines more secure. In addition, changing times for such conversions should be reduced.

According to the invention, these objects are achieved by the subjects of the independent claims. Advantageous embodiments and refinements are the subject of the sub-claims.

In a method according to the invention for operating a forming device for forming plastic preforms into plastic containers (and in particular plastic bottles), in a working mode of the apparatus, the plastic preforms are transported by means of a plurality of forming stations along a predefined transport path, and by loading with a fluid medium are expanded into plastic containers. Here, to expand the plastic preforms, blow-moulding devices are used, inside which the plastic preforms are expanded into plastic containers. Furthermore, in a change mode, at least one of the blow-moulding devices is removed from the apparatus (and/or the forming stations) and/or one of the blow-moulding devices is arranged on a blow-mould carrier of the apparatus (in particular on a blow-mould carrier of one of the forming stations), wherein to change the blow-moulding devices, a change device is used which comprises a gripper device for gripping the blow-moulding device.

According to the invention, in a working mode and/or during production, the forming device is operated in a first protected area which (at least for part of the time and in particular during working mode or production) is not accessible to and/or cannot be reached by a machine operator (or which the operator cannot enter). The change device is arranged at least partially in a second protected area which is accessible for the machine operator for at least part of the time in working mode, wherein a connection can be created between the first protected area and the second protected area.

For safety reasons, it is proposed that even in machines known from the prior art, some protected areas are provided, for example barriers which cannot be passed in working mode so that accidents can be prevented. To accelerate the change process, it is now proposed that the protected area, in which the forming device itself is arranged, is not accessible in working mode of the forming device and/or during production, but the area in which the change device is arranged is accessible. In this way, even during working mode, preparatory processes for a change process can be performed. The term "access to the protected area" generally means entering this protected area, and also the operator reaching in with a hand or poking his head in so as to be able to see certain areas of the plant. In particular however, "access" includes all processes which could lead to an increased risk for the operator.

In a preferred method, the change device, which in particular is configured as a robot, is itself placed locally outside a protected area of the machine or forming device. The protected area may for example have walls which surround the machine and which prevent access to the machine area during working mode. It would however also be possible for other devices to be used which prevent a machine operator from accessing the forming device during operation. Thus for example light barrier systems could be provided, which prevent access to the forming device during operation and for example cause the device to switch off if a user (or a user's body part) passes a light barrier. The second protected area surrounding the change device may for example also comprise actual walls or also a light barrier system.

The term "protected area" therefore in particular means a locally delimited area which, in particular for safety reasons, can be blocked off at certain times such as during machine operation.

Therefore it is advantageous to divide the protected area of the entire system, i.e. the system of forming devices and change devices, into at least two regions. The first protected area, as stated above, is closed during production of the containers. The second protected area, namely that of the change devices, can be accessed even during container production. In a further preferred method, during a working mode of the plant, a change process is prepared in the second protected area. Preparation may for example mean the provision of blow-moulding units to be inserted, or a detection of blow-moulding devices. Preferably, the two protected areas directly adjoin each other.

Preferably, the change device is arranged completely inside the second protected area for at least part of the time during a working mode of the apparatus (i.e. a mode in which plastic preforms are formed into plastic containers). Preferably, a main carrier, on which for example gripper arms are arranged, is arranged inside the second protected area. In this way, certain activities in preparation for a blow mould change, such as identification of blow-mould parts, can also be performed during operation of the apparatus.

In a further preferred method, to change the blow-moulding device, a change device is used which has a gripper device for gripping the blow-moulding device, wherein this gripper device is movable in at least two, different directions and/or pivotable relative to at least three pivot axes.

With such a design, as will be explained in more detail below, a very precise change process can be performed.

In a further preferred method, in working mode, the connection between the first protected area and the second protected area is interrupted.

As stated above, the second protected area could again be an actual housing or a light barrier system, however, it is also possible that the second protected area means merely the region or environment outside the first protected area.

In a further preferred method, during the change process, the two protected areas are connected together for at least part of the time such that the first protected area can be reached by the change device and/or by parts of the change device for at least some of the time. Thus preferably, during the change process (which in particular means a fully automatic insertion and removal of the blow-moulding devices), the two protected areas are connected together.

In a further advantageous embodiment, in a working mode, the forming stations are transported along a circular transport path. Advantageously, the forming device comprises a movable and in particular rotatable carrier on which a plurality of forming stations are arranged. Advantageously, during the change process, new blow-moulding devices or blow-moulding devices to be inserted are brought to at least one of the forming stations, preferably to several of the forming stations, and particularly preferably to all forming stations.

In a further advantageous method, a receiver device with (containing) a plurality of blow-moulding devices is moved into a working area of the change device. Preferably, this receiver device is brought into said second protected area. This receiver device may for example be a magazine which contains blow-moulding devices and/or parts of blow-moulding devices. It would also be possible for several magazines with blow-moulding devices to be brought into said second protected area in order to perform the change process. In this way, it is possible that either the entire blow-moulding devices are changed, or also only parts thereof such as the base parts or the side parts.

Preferably, the blow-moulding devices each have at least two side parts and a base part. Here, as stated above, it is possible that the entire blow-moulding device of a forming station is changed, but it would however also be possible to change only parts of the blow-moulding device.

In a further preferred method, to connect the two protected areas, a common interface between the protected areas is opened and in particular opened automatically. This interface may for example be a folding door, a roller shutter or similar. It would also be conceivable that, to connect the two protected areas, light barrier devices are deactivated.

In a further preferred method, the change preparation comprises process steps selected from a group of process steps which include the introduction of a mould magazine into a magazine receiver of the protected area by a machine operator, closure of the second protected area, a check/detection process of the blow-moulding devices introduced, and similar.

In a further preferred method, before or during the change process, blow-moulding parts are identified. Thus for example it is possible that by means of an identification system, blow-moulding devices or their components, such as a base part, can be detected. In a further preferred method, the blow-mould parts can be unambiguously identified. It is therefore possible to identify not only a specific type of blow-moulding device, but a concrete blow-moulding device or its components. In other words, preferably a detection system is provided which allows individual identification of the blow-moulding device or its parts.

This individual identification allows for example certain blow-mould parts to be assigned to specific forming stations. Preferably therefore, the change device performs a check and/or detection process. Advantageously, blow-mould parts or blow-moulding devices are identified in order to assign these blow-mould parts and/or blow-moulding devices to predefined forming stations or attach these thereto. It can thus preferably be established that each forming station receives precisely one specific blow mould.

During identification, different features of the blow-moulding devices can be identified and/or detected. Thus for example a required number of a blow-moulding device can be established, for example it can be checked whether blow-moulding device number 1 is situated in storage site or magazine site number 1. In addition, a specific mould type can be checked, for example its inner volume or form. In this way, a check can be performed against the type selected for a specific recipe (for example, it can be checked that, if the recipe calls for blowing a 0.5 L bottle, a corresponding blow-moulding device for production of 0.5 L bottles has actually been selected). In addition, in principle it can be checked whether a blow mould is present or not in a magazine device. Furthermore, as explained in more detail below, it can also be checked whether a blow-moulding device is inserted in the magazine in the correct position. Thus in response, a corresponding extraction can take place later.

In a further preferred method, before or during the change process, data characteristic of their position are assigned to the blow moulds and/or blow-moulding parts, and in particular to blow moulds (or parts) identified or to be identified. As stated, this may for example be a location within a magazine or a position within a magazine. These data can also be read into a control system. Thus on extraction of the blow-moulding devices, the system can respond accordingly and for example adapt gripping processes. In addition, it is also possible that values determined can be output, for example a specific position of a blow-moulding device or other values which identify and/or characterise the blow-moulding device.

Thus for example, a display device may be provided on which said values are output. In this case, the operator can very quickly check whether for example the positioning of the blow-moulding device is correct, or in general that the correct blow-moulding device is selected. Preferably, these values detected during the check or detection process, such as the positions of the blow-moulding devices, can be read into a control device and this information can also preferably be used during a change process, for example to insert a blow mould with the correct number into a forming station provided for this, in particular independently of a storage site of the blow-moulding device inside a magazine. In a further preferred method, a change process includes as method steps at least the opening of the second protected area, the introduction of a receiver device with a plurality of blow-mould parts into this protected area or into an action area of the change device, and/or the identification of at least some of the blow-moulding devices or blow-moulding parts introduced.

The present invention furthermore relates to an apparatus for forming plastic preforms into plastic containers. This apparatus has a transport device which transports the plastic preforms along a predefined transport path. Here, the transport device has a movable (and in particular rotatable) station carrier which is arranged at least indirectly on a stationary base carrier, and on which a plurality of forming stations are arranged. These forming stations each comprise blow-moulding devices which each form cavities, inside which the plastic preforms can be formed into plastic containers, and these blow-moulding devices are each arranged on blow-mould carriers, wherein the apparatus also comprises a change device which is suitable and intended at least to remove the blow-moulding devices from their blow-mould carriers and/or arrange blow-moulding devices on the blow-mould carriers. In addition, the change device comprises a gripper device for gripping the blow-moulding device.

According to the invention, the apparatus has a first protected area within which the forming device is operated, and furthermore the apparatus has a second protected area within which the change device is arranged at, least in portions, wherein the first protected area and the second protected area can be made accessible independently of each other and/or the first protected area and the second protected area can be brought into an interruptible connection with each other.

Therefore also, according to the method, it is proposed that separate protected areas are provided, and in particular the change device may be arranged in a different protected area from the forming device. This procedure, as stated above, allows to begin change preparation in a working mode of the actual forming device.

Preferably, the change device is situated completely in said second protected area for at least part of the time.

In a preferred embodiment, the first protected area and the second protected area can be connected together via an interface, wherein this interface also allows interruption of the connection. This interface, as stated above, may comprise for example folding doors, doors, sliding doors, roller shutters or similar.

In a further advantageous embodiment, the change device comprises a gripper device for gripping the blow-moulding device, wherein this gripper device is movable in at least two different directions and/or pivotable around at least three different axes.

The present invention furthermore relates to an apparatus for forming plastic preforms into plastic containers. This apparatus has a transport device which transports the plastic preforms along a predefined transport path, wherein the transport device has a movable station carrier (which preferably is arranged at least indirectly on a stationary base carrier), on which a plurality of forming stations are arranged, wherein these forming stations each comprise blow-moulding devices each forming cavities within which the plastic preforms can be formed into the plastic containers, and these blow-moulding devices are each arranged on blow-mould carriers, and the apparatus furthermore comprises a change device which is suitable and intended at least for removing the blow-moulding devices from their blow-mould carriers and/or arranging blow-moulding devices on the blow-mould carriers.

In an embodiment according to the invention, the change device comprises an identification device for identifying blow-moulding devices or blow-mould parts.

Advantageously, this change device has at least two gripper devices for gripping blow-moulding devices, wherein at least one of these two gripper devices is suitable both for gripping blow-moulding devices formed from several blow-mould parts and also for gripping individual blow-mould parts. This design ensures a greater variability of the forming device and of the change process. It is pointed out that this embodiment with two gripper devices may also be used independently of the presence of an identification device. The applicant therefore reserves the right to claim protection for an embodiment which indeed has no identification device but does have a change device with at least two gripper devices.

It is therefore proposed that the gripper device can hold the blow-moulding devices or elements thereof in different ways. Thus for example, it would be possible that the gripper device can receive two mould packets, or also the two side parts of the blow-moulding device as one packet and a base of the blow-moulding device separately.

In a preferred embodiment, this gripper device is movable in at least two different directions and/or pivotable about at least two different axes.

In a preferred embodiment, precisely two gripper devices are provided which for example may be arranged on a common carrier. It would thus be possible that one of these gripper devices receives a base of a blow mould and the other only the side parts.

In a preferred embodiment, the two gripper devices are suitable for gripping both blow-moulding devices formed from several blow-mould parts, and also for dripping individual blow-mould parts. In this way again, a greater variability or versatility of the gripper devices can be achieved.

In a further advantageous embodiment, the gripper devices are formed identically. Preferably, the gripper devices grip the blow-moulding devices only in an upper region of the blow-moulding devices. Preferably, this is an upper third of the blow-moulding device and in particular a portion which, in fitted state, protrudes from a mould receiver or blow-mould carrier. Thus for example it is possible that the blow-moulding device may have protrusions in which corresponding gripper means of the gripper devices can engage.

Thus for example, it is possible that the two gripper devices can remove two complete blow-moulding devices or, as stated above, parts of a single blow-moulding device.

In a further advantageous embodiment, the two gripper devices are arranged on a common rotatable and/or pivotable carrier. It would for example be possible for this to be guided to a forming station, then the first gripper device performs one process, then the carrier is rotated (for example by 180°) and the second gripper device performs a further process, such as arranging a new blow-moulding device on the forming station. In a preferred embodiment, the gripper device and/or this carrier is structured such that the gripper devices switch over in a circular space relative to a centre of the forming station which is smaller than 2000 mm, preferably smaller than 1500 mm and particularly preferably smaller than 1000 mm. Preferably, this carrier is rotatable about a rotation axis which runs parallel to the longitudinal directions of the blow-moulding devices or parallel to the longitudinal directions of the containers to be expanded. In a change mode, this rotation axis may be oriented vertically for at least some of the time.

Furthermore, with this procedure it would be possible for a travel movement of the change device or robot to be used to move a second gripper element into a change position. In a further advantageous embodiment, at least one gripper device has an actuator to move a second gripper element into a change position. Thus for example, this actuator, in the form of a rotation drive of said carrier on which the gripper devices are arranged, may turn or pivot.

In a further preferred embodiment (or the embodiment according to the invention described above), the change device comprises an identification device for identifying blow-moulding devices or blow-mould parts. It would for example be possible for a gripper head or the gripper device of the change device to comprise an RFID read and/or write module, in order to detect the type of blow-moulding device and/or a number of the blow-moulding device. In a further advantageous embodiment, each blow-moulding device has a corresponding read or write means, such as for example an RFID chip, which clearly identifies the blow-moulding device. In this way, as stated above, it is possible to load the individual forming stations with specific blow-moulding devices.

Preferably, each gripper device has such an identification device. Thus for example, it would be possible that the gripper device is moved up to the blow-moulding devices in a change mode, and clearly identifies these.

In a further advantageous embodiment, the identification device comprises an RFID detection device. Particularly preferably, this detection device comprises a read and/or write module. This read module may in particular detect the RFID tags on the blow-moulding devices. In a further advantageous embodiment, at least one blow-moulding device has an RFID element which can be read by an RFID detection device.

Advantageously, the change device comprises a position detection device for detecting a geometric position of blow moulds and/or blow-mould parts. In this way, as stated above, for example an incorrect position of blow-moulding devices within a magazine can be detected. In a preferred embodiment, this position detection device is a proximity sensor or proximity initiator. Thus for example, the gripper device of the change device may comprise such a proximity initiator in order to detect a geometric position of the blow-moulding devices.

In a further advantageous embodiment, both gripper devices comprise corresponding sensors in order to detect that the blow-moulding devices have been correctly received. In addition, the gripper devices also preferably have actuators so that a blow mould can be securely fixed and thus its safe transport guaranteed. Preferably, at least one gripper device, and particularly preferably, both gripper devices are active gripper devices, i.e. gripper devices which can execute a driven gripper movement, such as a movement in which a gripper element is moved up to another gripper element.

In a further preferred embodiment, said sensors and/or actuators are arranged only in an upper third of the blow-moulding devices or above, relative to a longitudinal extension of a blow-moulding device. In this way, a blow-moulding device arranged on a carrier can be gripped securely and transported away from this carrier.

Preferably, the blow-moulding device has holding means in an upper region, in particular an upper third, which allow the blow-moulding device to be held by the change device. Thus for example, on a top of the blow-moulding device, in particular on a top of the two side parts of the blow-moulding device, a protrusion (in particular a pin) may be provided which the gripper device can grip. In addition, in an upper region of the blow-moulding device, a groove may be provided in which the gripper device can engage in order to grip the blow-moulding device. This may be a first groove which is formed in a region of the first side part, and a second groove which is formed in a region of the second side part. Preferably, this first groove and the second groove may adjoin each other when the blow-moulding device is in assembled state. In addition, the blow-moulding device may have a centring element which causes centring relative to a gripper device. This centring device may for example be formed as a centring cone. This centring device may in particular be arranged on a top side of the blow-moulding device, and in particular on the surfaces of the two side parts.

In addition, the blow-moulding device preferably has fixing devices for fixing the blow-moulding device to a carrier, in particular a blow-mould carrier. This fixing device may for example be arranged on an outer wall of the blow-moulding device and in particular its side parts. Preferably, this fixing device is situated in an upper third of the blow-moulding device or side parts.

Centring elements may also be situated in a peripheral region of the blow-moulding device, for example on the peripheral walls of the two side parts. The centring elements may for example be centring pins.

In a further advantageous embodiment, control lines are provided which, for example activate the actuators of the gripper devices. These may for example be control, sensor or power supply cables for the gripper device. Advantageously, such lines at least in regions run inside the change device and/or may preferably be guided via energy transmitters, such as for example slip rings, directly through axes of the change device or robot.

The present invention furthermore relates to a method for operating a forming device for forming plastic preforms into plastic containers, wherein in a working mode of the apparatus, the plastic preforms are transported along a predefined transport path by means of a plurality of forming stations, and by loading with a fluid and in particular a gaseous medium, are expanded into plastic containers, and wherein to expand the plastic preforms, blow-moulding devices are used inside which the plastic preforms are expanded into plastic containers, and wherein in a change mode, at least one of the blow-moulding devices of the apparatus is removed and/or one of the blow-moulding devices is arranged on a blow-mould carrier of the apparatus (or in general at least one blow-moulding device is arranged on a forming station).

According to the invention, to change the blow-moulding devices, a change device is used, and by means of an identification device at least part of a blow-moulding device to be changed is identified.

In this embodiment too, it is therefore proposed that the blow-moulding devices are identified, in particular to allow individual allocation of the blow-moulding devices to the forming stations, even if the blow-moulding devices have been incorrectly placed in a magazine. Advantageously, to change the blow-moulding devices, two gripper devices are used, wherein particularly preferably one of these two gripper devices is suitable and/or intended both for gripping blow-moulding devices formed from several blow-mould parts and for gripping individual blow-mould parts (for example side parts or base parts).

In a further advantageous embodiment, at least one gripper device grips at least one blow-moulding device in an upper region relative to a longitudinal direction of the blow-moulding device. Preferably, this is an upper third of the blow-moulding device. In this way, particularly preferably, the blow-moulding device can be transported suspended from the gripper device.

Preferably, at least for part of the time, the two gripper devices each hold blow-moulding devices or parts of blow-moulding devices. Thus it is, possible that, at least for some of the time, both gripper devices carry a complete blow-moulding device, but it would also be possible that for some of the time, one of the gripper devices carries first components of a blow-moulding device (for example side parts) and the second gripper device carries another component of the blow-moulding device (such as for example a base part).

In a further advantageous embodiment, at least one gripper device and preferably both gripper devices comprise sensors to detect that the blow-moulding device has been correctly received, and/or actuators to fix the blow-moulding device securely. These sensor devices may for example be proximity sensors.

In a further preferred method (in particular on removal of blow-moulding parts), the following process may be performed. A first gripper device may grip only the side parts (in particular the upper third thereof) and firstly fix and/or remove these. In a further step, it is conceivable that a blow-mould carrier opens and now the blow-moulding device is only arranged on the gripper device. In a further method step, the gripper device, with the side parts now arranged thereon, moves out of the forming station. In the further method step, the gripper devices are switched over, for example the carrier with the two gripper devices is turned so that now the base part of the blow-moulding device can be removed. The second gripper device now receives the base part of the blow-moulding device (in particular below the region forming a container). In this way, the region which defines the form of the container can be protected.

In a further preferred method, the blow-moulding devices are removed from the forming stations, wherein a removal movement takes place for at least some of the time perpendicularly to a longitudinal direction of the blow-moulding parts. Thus in particular it is possible that, before the gripper device is switched over, for example before the carrier on which the blow-moulding devices are arranged is rotated, the gripper receiver performs a movement which is substantially radial relative to the middle of the blow-moulding machine and perpendicular to the main axis of the mould carrier, in order to remove the old mould from the blow-mould carrier.

Furthermore, as stated above, it is possible that a travel movement the change device is used to bring the second gripper device into a set position.

In a preferred method, therefore, the side parts and the base part of the blow-moulding device are removed in temporal succession.

In a further preferred method, the change device deposits an old mould and receives a new mould while the blow-mould carrier is being closed and/or locked, and/or while the transport device is moving on, in particular while the blowing wheel is turning further. In this way again, the total change times can be reduced.

In a further preferred method, at least one gripper device is alternately loaded with a blow-moulding device to be removed from the forming station and one to be arranged on the forming station. Here, as stated above, during the change process the transport wheel may turn further, in particular while an old mould is being deposited and a new mould received.

In other words, it is conceivable that a gripper device is loaded with the old and new moulds alternately in order to avoid switching of gripper devices, for example when depositing the old mould and receiving the new mould.

In a further advantageous embodiment, the gripper devices are configured such that interfaces for receiving the blow-moulding devices are configured mirror-symmetrically relative to the middle of the gripper devices. In this way, with the same gripper devices, identical blow-moulding devices can be gripped.

In a further advantageous embodiment, a control device controls the gripper device such that firstly an old mould is deposited in an empty position of a receiving device, such as a magazine, and in relation to the last old mould removed, the numerically next new mould (for example from a chaotic store) is taken from the magazine. If the blow-moulding devices are partially removed, such as firstly the side parts and then the base part, it is possible that the base parts are deposited in a separate magazine. Preferably, this magazine has matrix-like receiving positions.

In a further advantageous method, the base parts of the blow-moulding device are turned relative to an axis standing perpendicularly to a longitudinal direction of the containers to be formed. In particular, a turning takes place after removal from the forming stations. Preferably, the base parts of the blow-moulding devices are deposited with a forming side, i.e. the surface which produces the container, facing downward in a magazine. In this way, these surfaces can be better protected.

In a further advantageous embodiment, interfaces of the gripper device are configured such that the blow-moulding devices are transported substantially vertically without pivoting or a tipping (relative to their original position in the mould receiver). Preferably, it is possible that the base parts are turned after removal from the mould receiver and before depositing in the magazine. Advantageously, this turning movement is performed by the change device or the body itself, or also by an actuator on the gripper device.

In a further preferred method, a general control system controls the switching of the gripper devices such that information from reading the mould positions in the magazine (for example via RFID) and/or recipe information is used to switch these accordingly.

Preferably, however, the change device moves within a limited working area. This means that, in particular, also the removal and supply movement for the blow-moulding devices takes place in a limited working area. In response to the external forces, a position may deviate from this working area. Otherwise, however, it is preferred to observe this defined working area, in particular during a mould change.

Here, it is advantageously possible that the working area of the change device is limited for safety reasons and in particular mechanically. Such a boundary could be achieved by various measures, such as by light barriers which detect an incorrect or excessive movement of the change device and as a result cause either a return or an emergency stop of the change device. In addition, however, the working area could be limited by mechanical elements such as stops.

Figure 4:
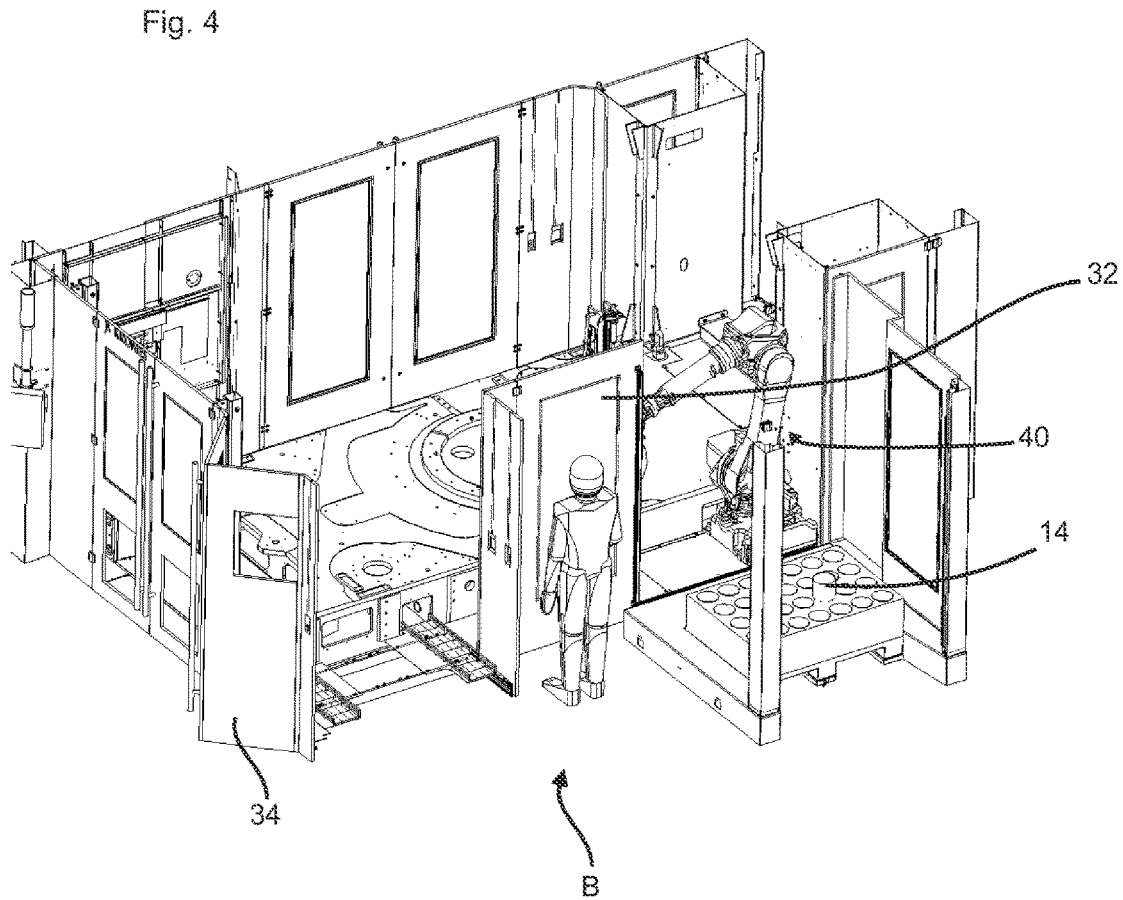
Figure 5:
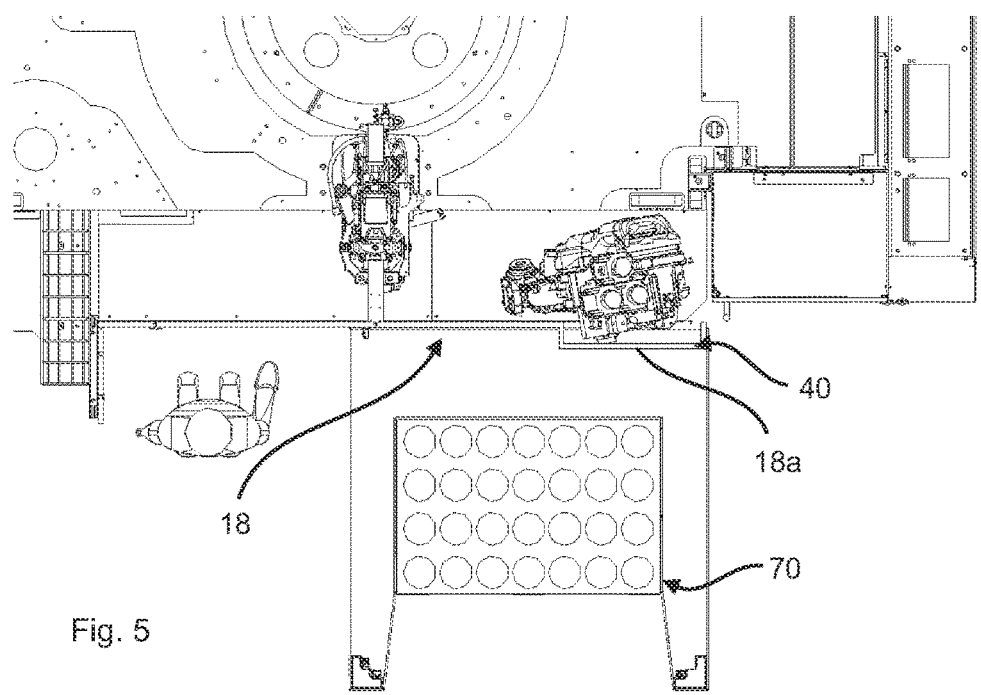
Figure 6:
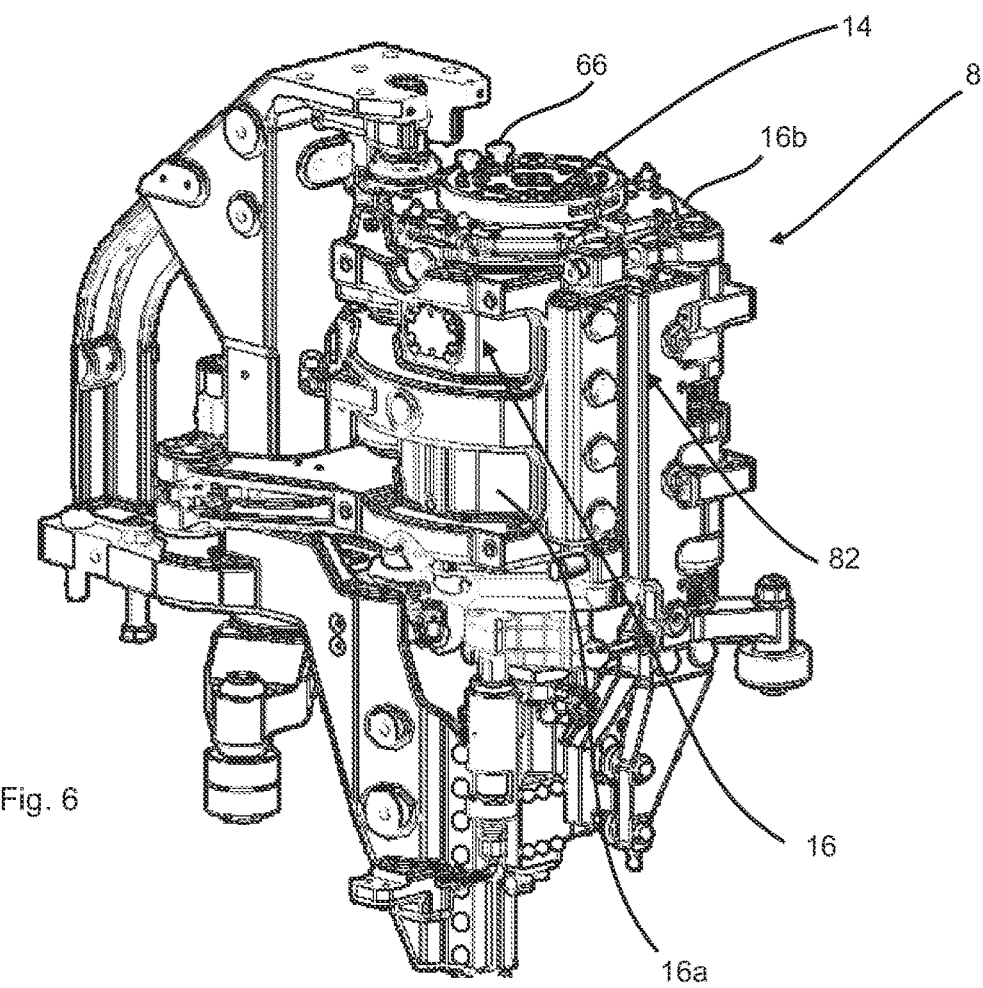
Figure 7:
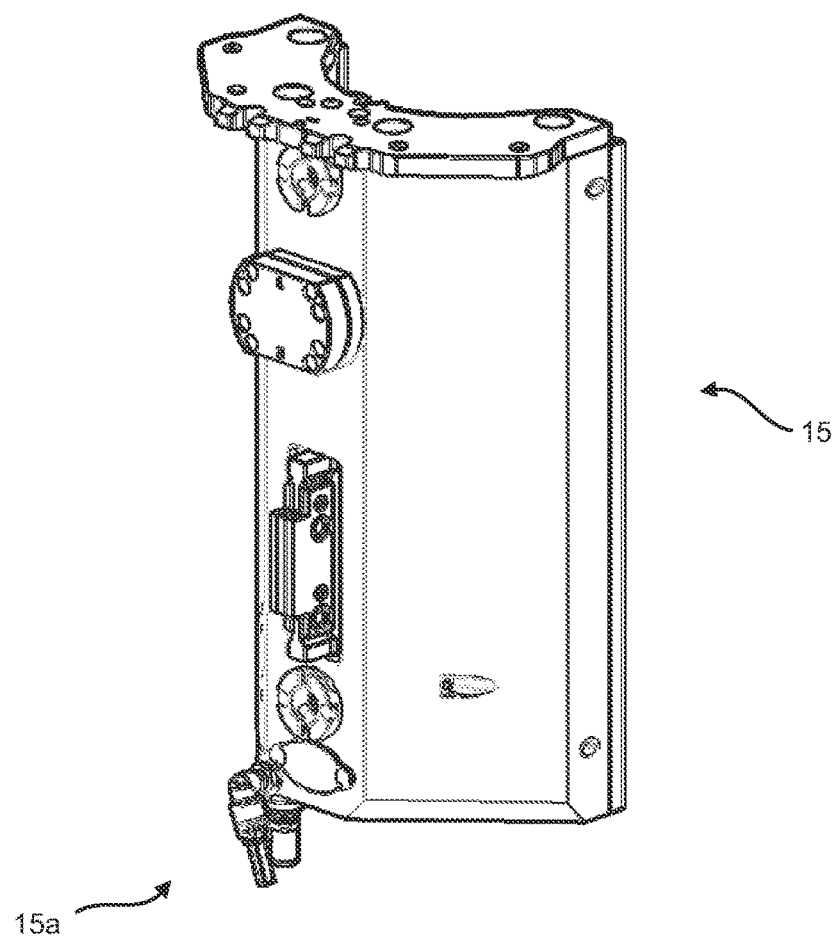
Figure 8:
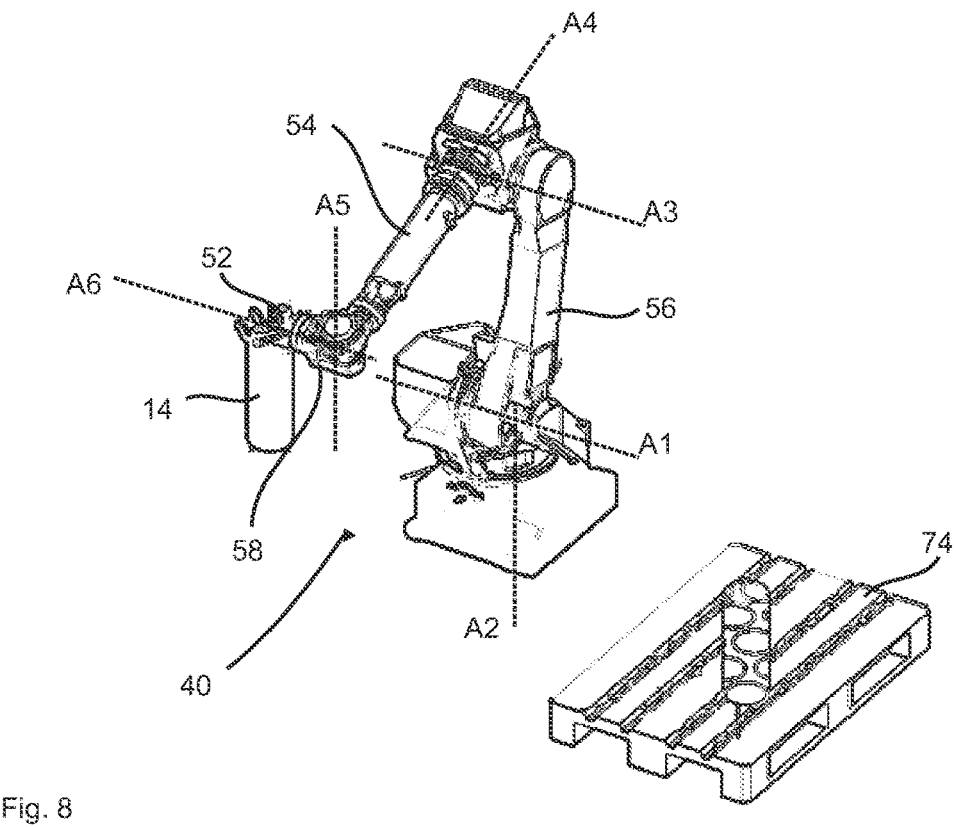
Figure 9:
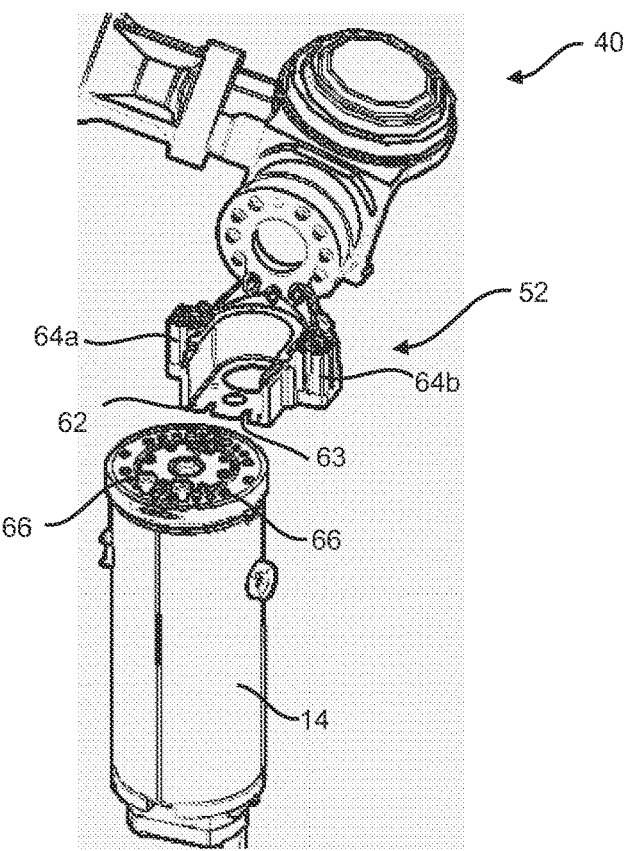
Figure 10:
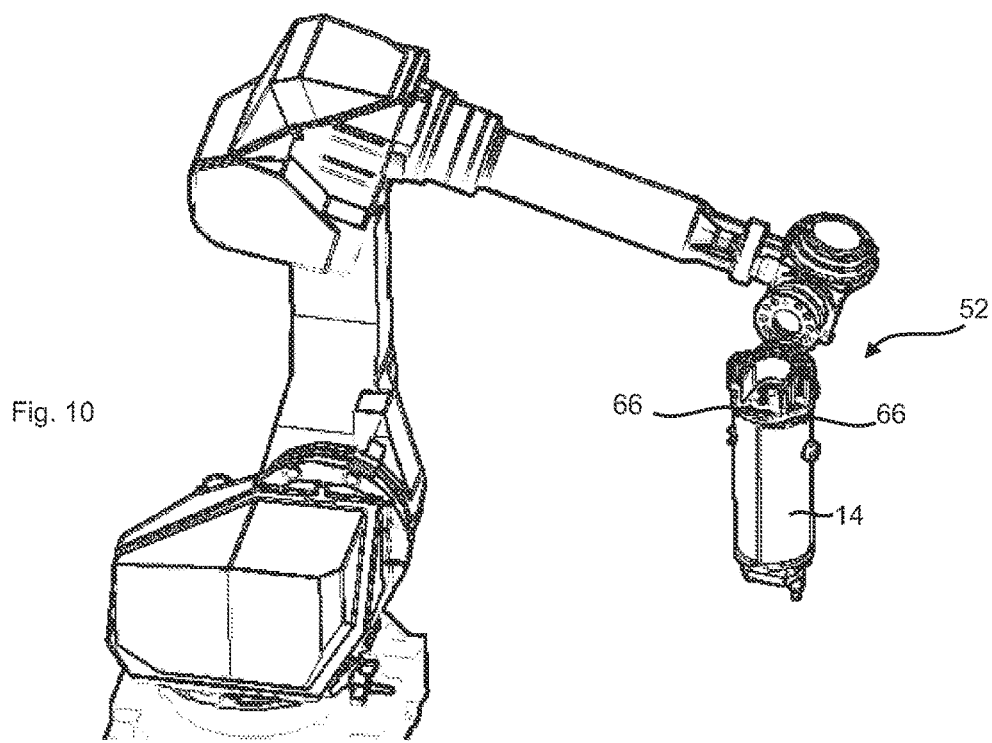
Figure 11:
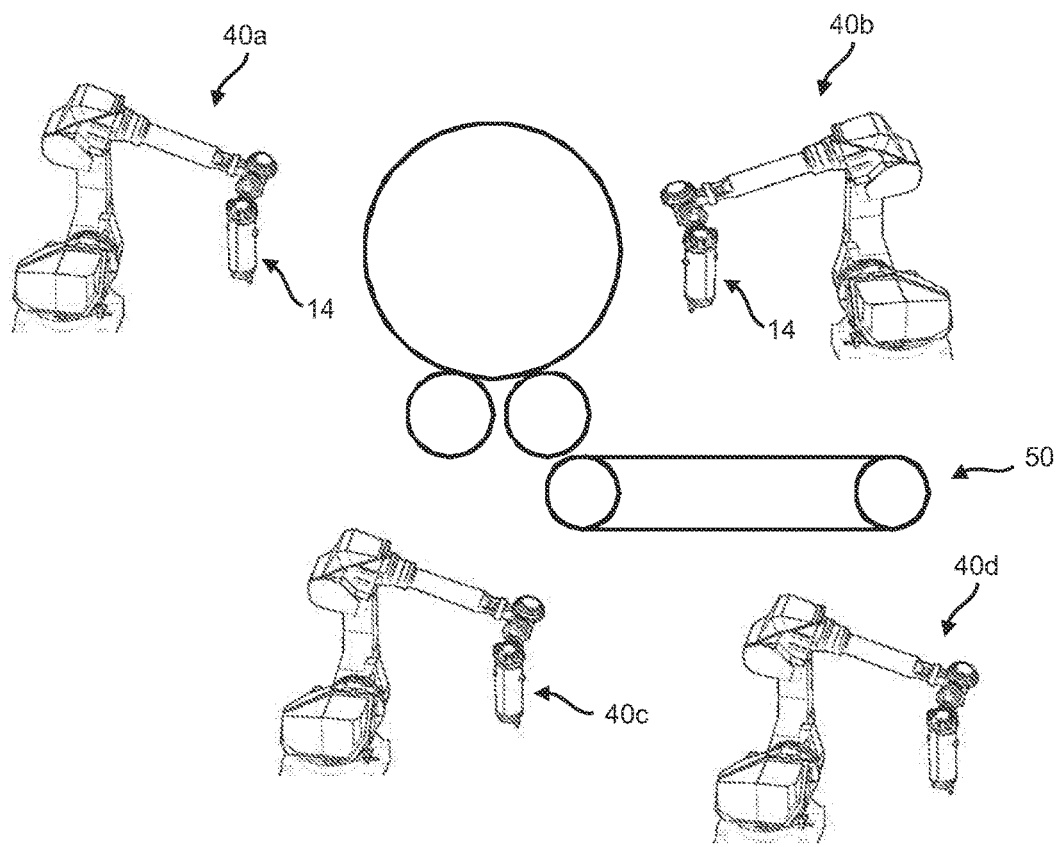
Figure 12:
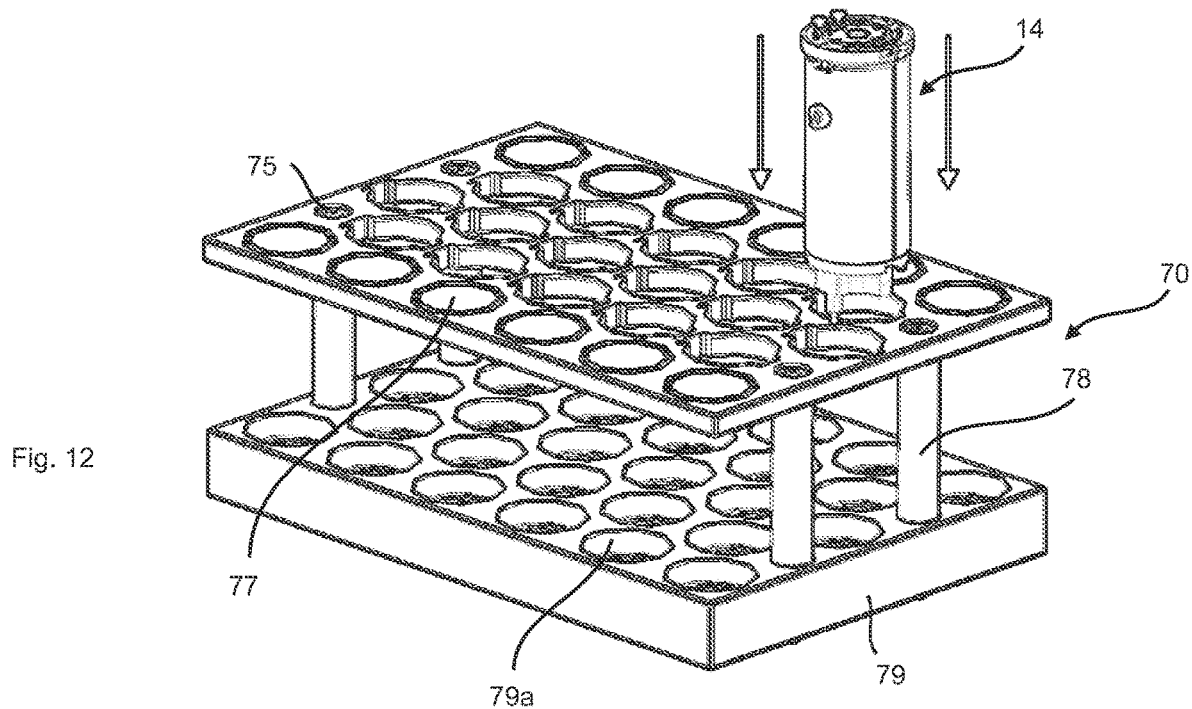
Figure 14A:
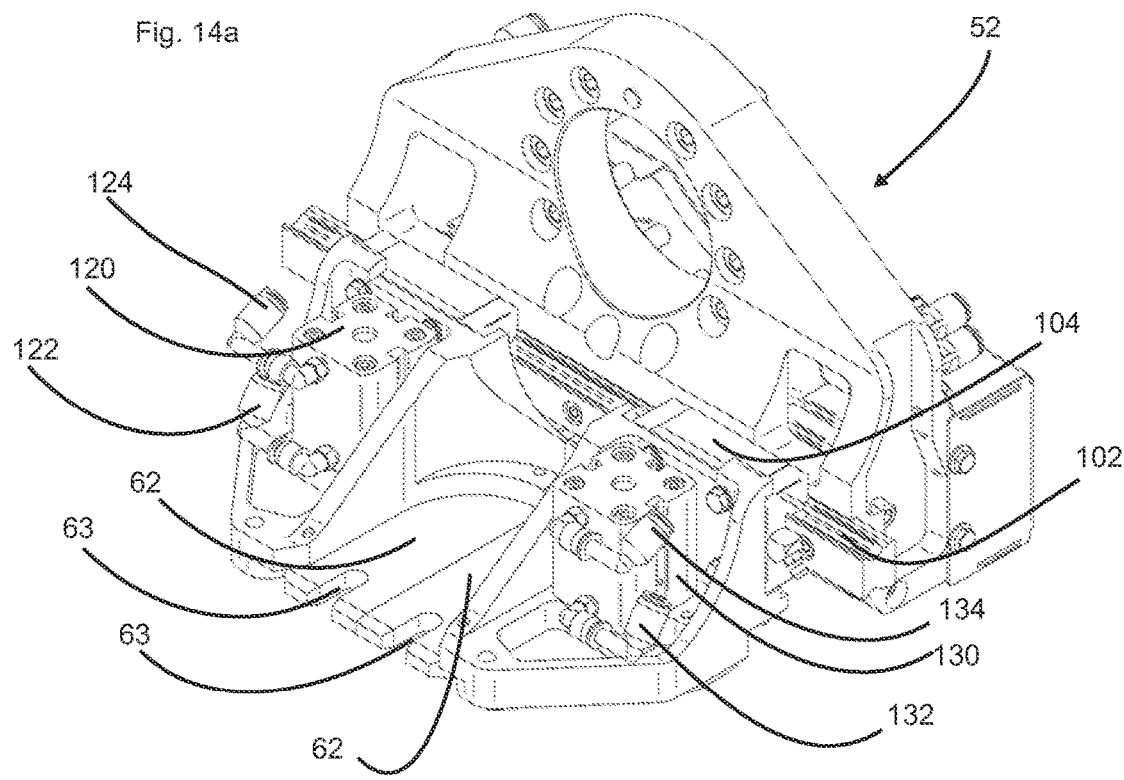
Figure 15A:
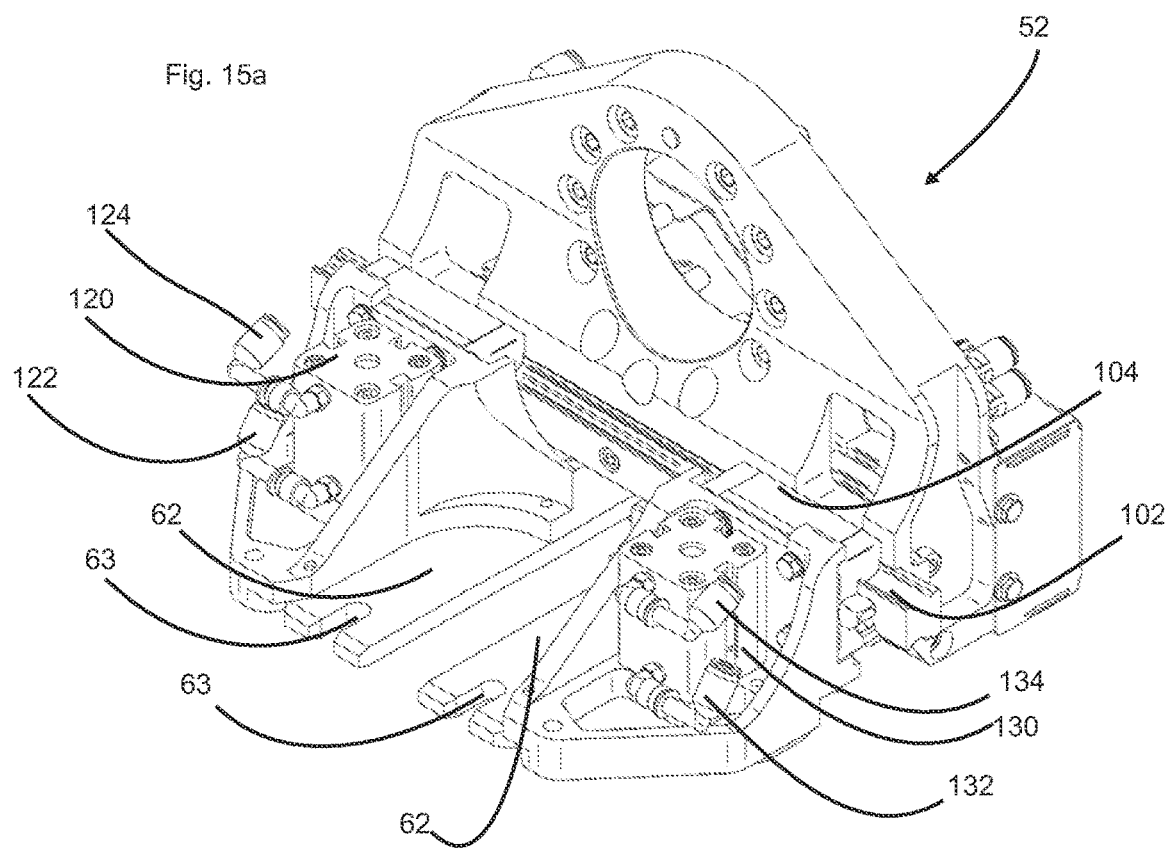
Figure 16:
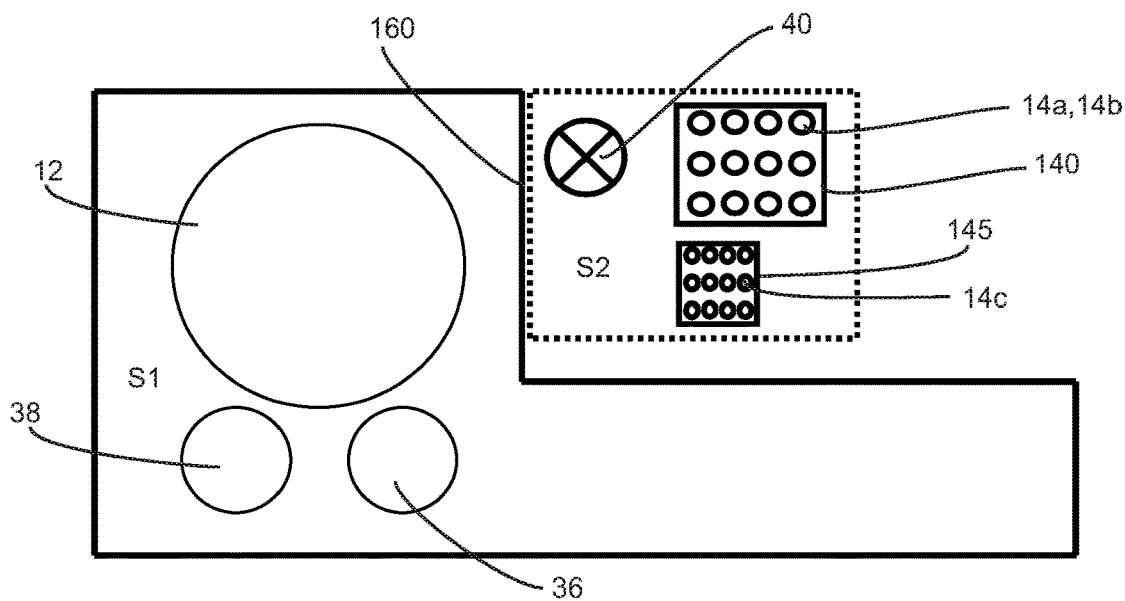
Figure 17:
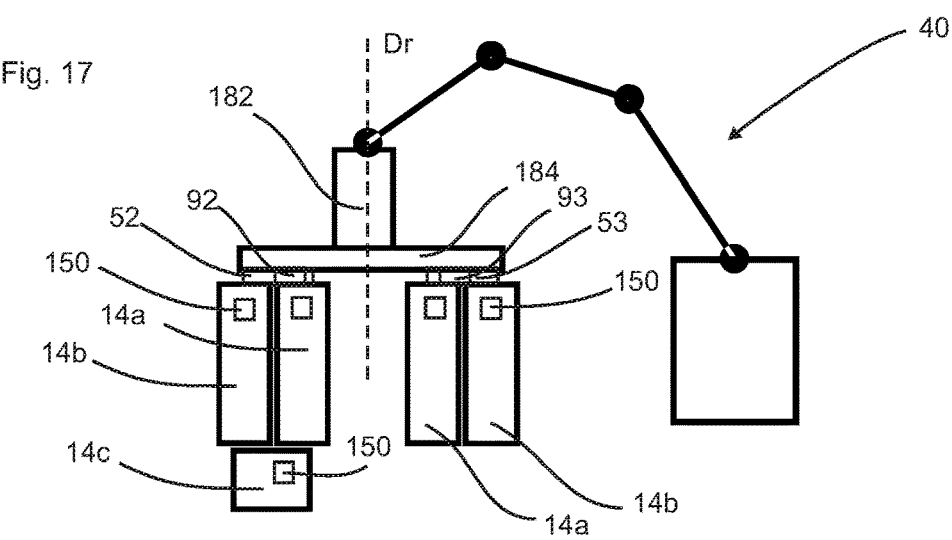

Further advantages and embodiments arise from the enclosed drawings. These show:

FIG. 1 a diagrammatic depiction of an apparatus according to the invention;

FIG. 2 a depiction of the apparatus with change device shown;

FIG. 3 a top view of the apparatus shown in FIG. 2;

FIG. 4 a further depiction of the apparatus shown in FIG. 2;

FIG. 5 a further depiction of the apparatus shown in FIG. 2 in a further working position;

FIG. 6 a depiction of a forming station;

FIG. 7 a depiction of a mould shell for a blow-moulding device;

FIG. 8 a depiction of a change device;

FIG. 9 a depiction of a gripper device for gripping a blow-moulding device;

FIG. 10 a depiction of a change device with blow-moulding device;

FIG. 11 a depiction to illustrate possible positions of the change device;

FIG. 12 a depiction of a magazine with a blow-moulding device;

FIG. 13a-13h depictions to illustrate a partial change of a blow-moulding device;

FIG. 14a,b two depictions of a gripper device;

FIG. 15a,b two further depictions of a gripper device;

FIG. 16 a depiction of an apparatus according to the invention with two protected areas;

FIG. 17 a depiction of a change device with two gripper devices; and

Figure 18:
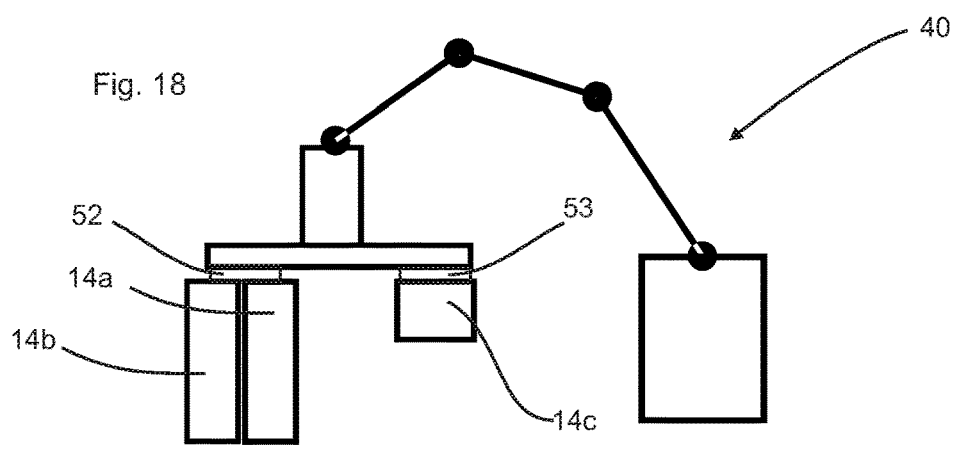

FIG. 18 a depiction of the gripper device in FIG. 17 in a different usage state.

FIG. 1 shows a diagrammatic depiction of an apparatus 1 for forming plastic preforms into plastic containers. The plastic preforms 10 are supplied to the individual forming stations 8 and expanded into plastic containers 20. After this expansion, the plastic containers are removed from the apparatus again. To this end, a supply star may be provided which supplies the plastic preforms to the apparatus 1, and a discharge device, in particular also a transport star, which extracts the finished containers from the apparatus. The apparatus 1 has a station carrier 12 on which a plurality of forming stations 8 are arranged. This station carrier may for example, as shown in FIG. 1, be a blowing wheel which is rotatable relative to a rotation axis D (which here runs perpendicular to, the drawing, plane and hence vertically). Each individual forming station here has a blow-moulding device 14. This blow-moulding device 14 is composed of two side parts and a base part. These blow-moulding devices may be exchanged according to the invention. The blow-moulding devices 14 are arranged on blow-mould carriers 1 and may be removed from these or arranged thereon.

Reference sign 40 designates a change device which serve to remove the blow-moulding devices from their blow-mould carriers or arrange the blow-moulding devices on the blow-mould carriers. Reference sign 6 designates a base carrier on which the station carrier 12 is rotatably mounted. The change device 40 is also arranged on or next to the base carrier 6. Thus the change device 40 may be integrated in the apparatus. Reference sign 18 designates a housing which at least partially surrounds the station carrier 12 but however preferably, as shown below, may also enclose or accommodate the change device 40.

Reference sign W designates a change position. As stated above, the blow-moulding devices are preferably changed at a specific change position. This means that the forming stations can be moved successively to this change position W by rotating the carrier 12, and then the old blow-moulding devices are removed from this change position and new blow-moulding devices can preferably be supplied. Reference sign R designates a radial direction. The change device or a gripper device of the change device is preferably brought in this radial direction up to the forming stations or blow-moulding devices in order to change them.

FIG. 2 shows a perspective depiction of an apparatus 1, wherein here only one forming device or forming station 8 is shown. The station carrier is arranged thereon but is also not shown. Furthermore, however, the figure shows the base carrier 6 on which the change device 14 is arranged. This change device 40 here has a first pivotable arm 56 and a second pivotable arm 54. The two arms are connected together pivotably via a hinge and drive connection.

Reference sign 52 designates a gripper device which serves to grip and transport the blow-moulding devices. This gripper device is again mounted pivotably on the second arm 54 and is preferably also rotatable. Thus as a whole, the gripper device can be pivoted spatially through at least three, preferably at least four axes. In addition, it would also be possible, as indicated by the dotted rectangle, for several change devices to be provided, wherein these are arranged in particular each at least indirectly on the base carrier 6. In this way, in change mode, the individual blow-moulding devices could be exchanged more quickly.

Reference sign 46 designates diagrammatically a detection device which detects forces acting on the change device 40 or the gripper device 52 so as to be able to disconnect these in an emergency. Advantageously, the apparatus comprises several such detection devices, preferably assigned to each individual drive device causing a movement of the change device 40 or gripper device 52. These detection devices may for example be force-measuring devices which determine actual forces, torques and similar. It would however be also possible for the forces to be determined from parameters of the respective drive, such as from currents or similar.

Reference sign B designates an operator using the plant. During operation of the change device, the latter advantageously cannot move into regions which can be reached by the change device 40.

Reference sign 22 designates a control device for controlling the change device. Reference sign 42 designates a control device for controlling the forming device itself. The two control devices can interact, in particular for a change mode for exchange of blow-moulding devices. Here it is possible that, in normal working mode, the change device 40 of the apparatus proceeds into a rest position in which the change device takes up as little space as possible.

FIG. 3 shows a top view of the apparatus shown in FIG. 2. It can be seen that here the change device 40 is also integrated in the housing 18. In the state shown in FIG. 3, the arm 56 is already pivoted out so that the gripper device 52 can simply grip a blow-moulding device.

In addition, a magazine device 70 is depicted which has a plurality of receiving points 72 for receiving the blow-moulding devices. These blow-moulding devices may each be introduced into the receiving points or holes 72.

FIG. 4 shows a further depiction of the apparatus according to the invention. It is evident that a wall 32 is provided here which separates the operator B from the change device 40 so that he cannot be injured. In addition, further movable wall parts 32 may be provided so that firstly the machine is more easily accessible for maintenance, or secondly further change devices may be provided, as also depicted in FIG. 1.

The depiction shown in FIG. 5 is similar to that of FIG. 3, wherein however here the change device 40 is in another operating position. This may for example be a working mode in which the apparatus forms plastic preforms into plastic containers. It is evident that a recess 18a may be arranged in the housing 18 which serves to receive the change device 40 completely. In the state shown in FIG. 5, the individual arms of the change device 40 may be folded up such that the change device 40 only takes up little space.

FIG. 6 shows a view of the forming station 8. Here we see the blow-mould carrier 16 which may comprise two blow-mould carrier parts 16a, 16b, which can be pivoted apart to open and close the blow-moulding device 14. The two blow-mould carrier parts 16a, 16b may also be pivoted apart for change mode, so that the blow-moulding device 14 can be removed.

Reference sign 82 as a whole designates a locking device which locks the two blow-mould carrier parts 16a and 16b together in working mode, so that these can pivot apart even under high pressures. Reference sign 66 refers to a protrusion arranged on the two side parts of the blow-moulding device 14. This protrusion is designed so stably that the entire blow-moulding device 14 can be carried via this protrusion. The protrusion 66 may be gripped by the gripper device or part of the gripper device, so that the gripper device 52 can carry the blow-moulding device via this protrusion. The blow-moulding device as a whole can also be held together by holding the respective side parts of the blow-moulding device via the protrusion 66.

FIG. 7 designates a blow-mould carrier shell. This blow-mould carrier shell 15 may be arranged on the blow-mould carrier 16 and itself receive the blow-moulding device or parts of the blow-moulding device. Here, supply and discharge elements 15a may be provided in order to supply media, such as e.g. tempering media, to the blow mould shell 15.

FIG. 8 shows a further depiction of the change device 40. Here again the first arm 56 is depicted which is pivotable about a first axis A1. In addition however, this arm 56 is also rotatable about a second axis A2. A second arm 54 is arranged on this first arm 56, and the arm 54 is also pivotable relative to the first arm 56 about an axis A3. Here the two axes A1 and A3 run parallel to each other. These axes may however also be arranged obliquely or skewed relative to each other. In addition, the second arm 54 is also rotatable about a fourth axis A4.

To achieve this respective pivot and rotational movement about individual axes, and also in relation to further axes to be described, drive devices are provided such as, in particular but not exclusively, electric motor drives. In addition however, the use of pneumatic and/or hydraulic drives would, be conceivable. A gripper device 52 is provided on the second arm 54 and serves to grip the blow-moulding device. This gripper element is pivotable about an axis A5 relative to the arm 54. This axis A5 may here stand perpendicular to the axis A3 and/or also perpendicular to the axis A4. In addition, the gripper device is arranged on the arm 54 via a carrier 58. The gripper device itself may in turn be rotatable relative to this carrier 58 about an axis A6.

By means of this multiplicity of movements, the blow-moulding devices 14 can be removed from the individual forming stations and placed on a carrier 74, here depicted as a Euro-pallet. It would however also be possible to place the blow-moulding devices 14 directly into openings provided in a magazine.

A distance between the magazine device or the pallet 74 and the change device 40 may here lie between 1 metre and 2 metres. A corresponding action radius of the change device may lie in a region of 1.5 metres.

FIG. 9 shows a detailed depiction of the change device 40 or its gripper device 52. This gripper device may have a guide element 62 which can be guided via a corresponding surface of the blow-moulding device. In addition, protrusions 64a, 64b may be provided which serve for centring the change device 40, or more precisely the gripper device, relative to the forming station. Reference sign 63 refers to a recess arranged in the guide element 62 which can catch behind the protrusions for changing the blow-moulding device. In this way the guide element 62 also serves to carry the blow-moulding device 14.

FIG. 10 shows a depiction of a change device with a blow-moulding device 14 arranged thereon. It is evident that the gripper arm 52 here engages in two protrusions 66 arranged on the blow-moulding device 14 and presses these together so that the blow-moulding device is held together in this way. Thus the protrusions 66 shown in FIG. 9 and FIG. 6 and arranged on the blow-moulding device 14 also serve to hold the latter together during transport. Here, advantageously, the gripper device 52 engages in elements of the blow-moulding device arranged above said device in order to hold this. This manner of engagement in the blow-moulding device is particularly suitable since the blow-moulding device, as also shown in FIG. 6, protrudes beyond its carrier and can thus be gripped even when the blow-mould carrier 16 is in a closed state. Thus it is possible for the change device or robot firstly to grip the blow-moulding device 14 via its protrusions 66, and only then is the blow-mould carrier opened. In this way, it can be ensured that the blow-moulding device is securely held at all times.

FIG. 11 shows a further depiction of the present invention. Here, several change devices 40a-40d are provided which can each change elements of the apparatus. Here for example, it would be possible for two of the change devices (40a, 40b) to be provided for changing blow-moulding devices 14, but also further change devices (change device 40d) may be provided for changing other elements, for example heating mandrels situated in an oven 50 for heating the plastic preforms. In addition, the change device 40c shown may for example change holding elements, such as transfer pincers which transport the plastic preforms after heating to the forming device 1.

FIG. 12 shows a receiver device such as a magazine for receiving the blow-moulding devices 14. This may contain a carrier plate 75 with a plurality of openings 77. By means of carriers 78, this plate 75 can be arranged on a base carrier 79, wherein this base carrier 79 in turn has openings 79a or holes for receiving the blow-moulding devices. Advantageously, this magazine has, same dimensions as said Euro-pallet, and hence preferably dimensions in a region of 1200×800 mm. The individual openings 79a are here arranged in rows, as shown in FIG. 12, and offset to each other so that a maximum number of blow-moulding devices can be placed on the pallet.

Figure 13E:
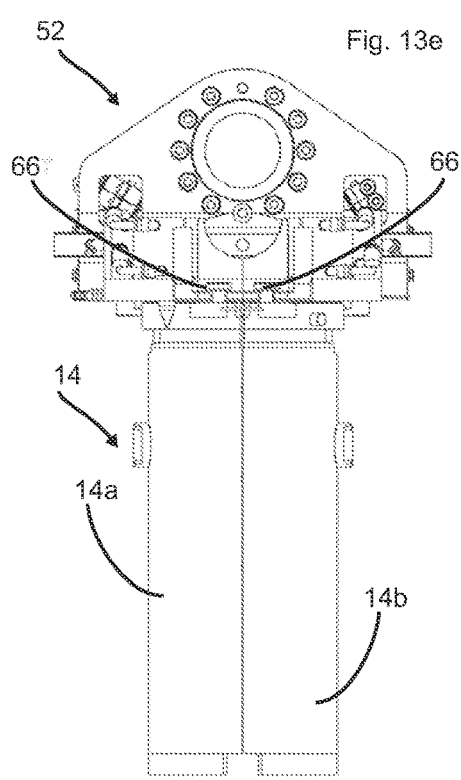
Figure 13F:
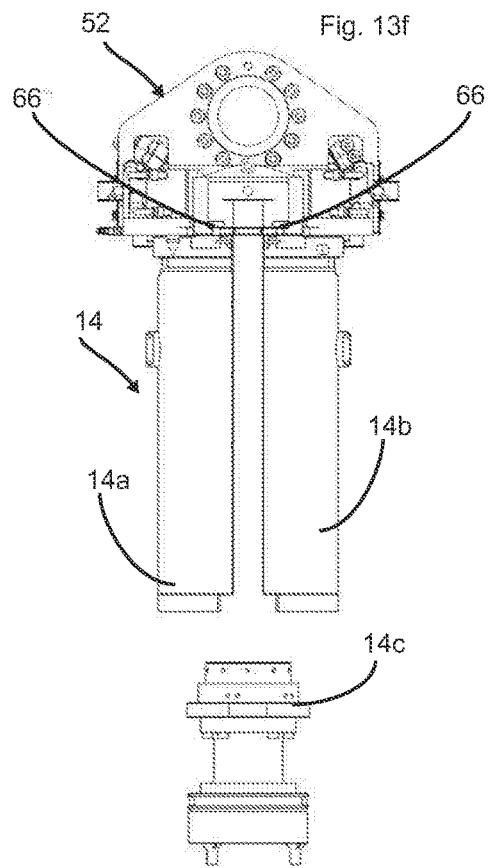

FIGS. 13a-13h illustrate a change process for a blow-moulding device in which it is not the complete blow-moulding device which is changed but merely its side parts. In the depiction shown in FIG. 13a, a complete blow-moulding device 14 is arranged on a gripper device 52. Here the gripper device 52 removes the entire blow-moulding device, i.e. both the side parts 14a and 14b and the base part 14c which is mechanically coupled to the side parts 14a and 14b, from the blow-moulding machine. In a further step, the entire blow-moulding device 14 is placed or arranged on a deposit site (not shown) for the base part 14c. In a further method step, the gripper device 52 opens as shown in FIG. 13d. To this end, two holding elements of the gripper device 52, as will be explained in more detail below, can be pushed apart in order thus to move the two side parts 14a and 14b apart from each other.

Figure 13G:
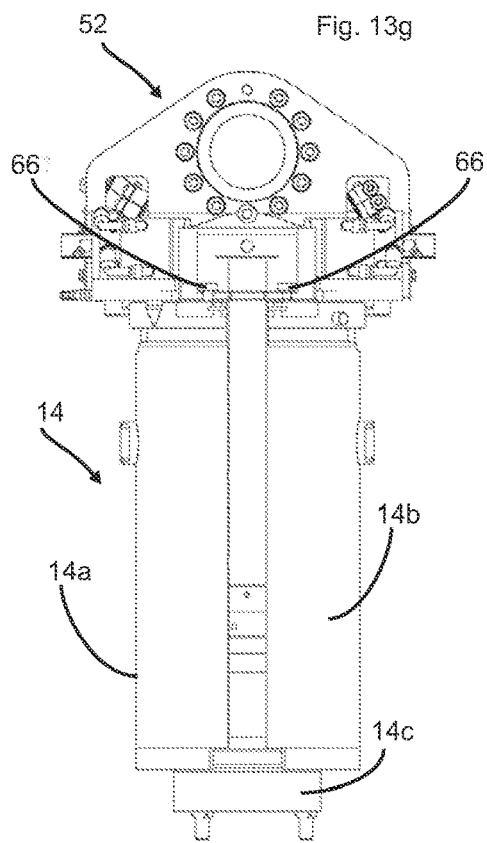

In the situation shown in FIG. 13c, the gripper device 52 with only the side parts 14a and 14b arranged thereon is moved upward. The base part 14c remains on its deposit site. In the situation shown in FIG. 13d, the two side parts 14a and 14b are deposited in a corresponding store (not shown). Furthermore, as shown in FIG. 13e, new side parts 14a and 14b are taken from the store (not shown). In the situation shown in FIG. 13f, these two side pails are again moved apart and, with the gripper device opened, placed accordingly over the old base part 14c. This situation is also shown in FIG. 13g. In this situation, the two side parts 14a and 14b are moved down and, on subsequent closure of the gripper device 52, the old base part is received by the two blow moulding side parts 14a and 14b.

Figure 13H:
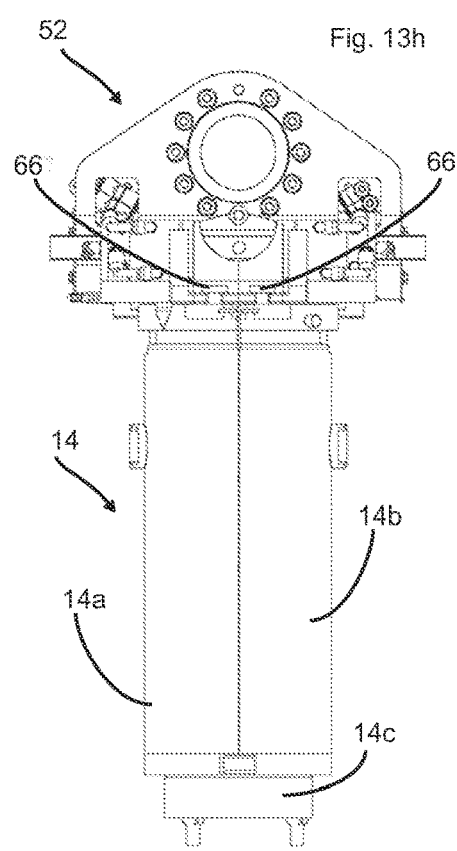

Finally, the new side parts 14a and 14b and the original base part 14c can again be attached to a mould carrier (not shown) as illustrated in FIG. 13h.

Figure 14B:
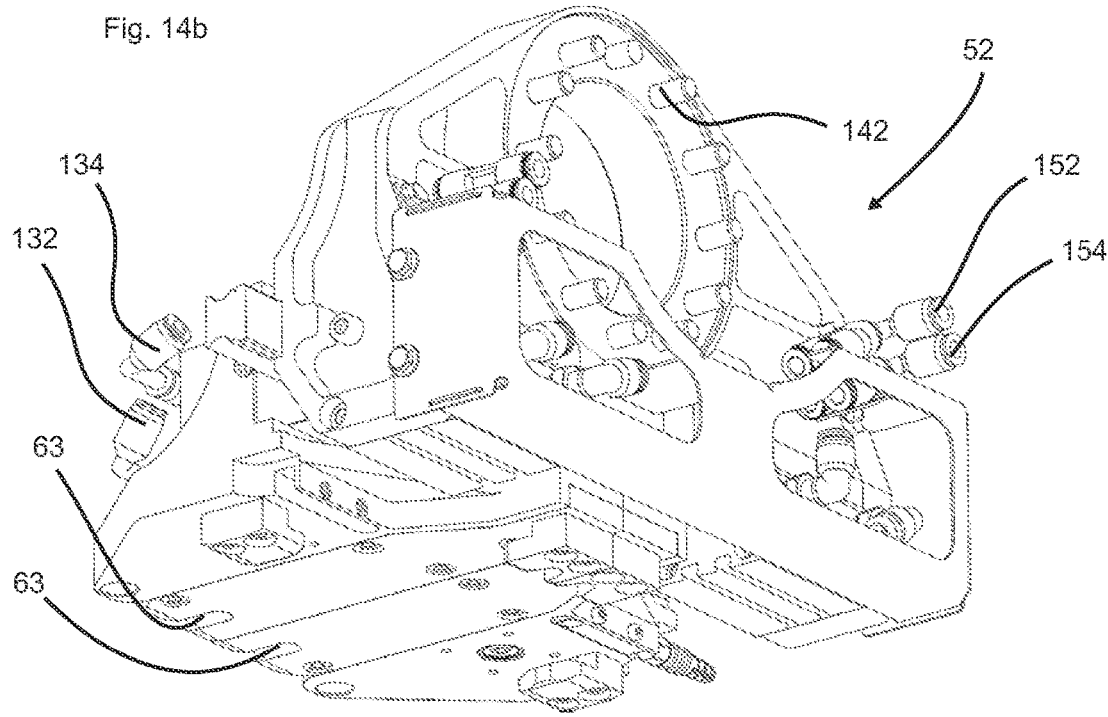

FIGS. 14a and 14b show a depiction of a gripper device which is suitable and intended to move the two side parts away from each other in order thus to release the base part. FIG. 14a shows a view from above onto the gripper device, and FIG. 14b a view from below. It can be seen that this gripper device 52 again has two guide elements 62 in which recesses 63 are arranged for receiving the protrusions 66 arranged on the side parts. Whereas however in the embodiment shown above, this guide element 62 was formed as one piece, now two such guide elements 62 are provided which can be moved apart. To this end, these guide elements 62 (and hence also the recesses 63) are each arranged via a slider 104 on a carrier 102 and can be moved relative to this. Reference sign 120 refers to a first drive device for moving the left guide element shown in FIG. 14a, and reference sign 130 relates to a drive device for moving the right guide element 62 shown in FIG. 14a. Reference signs 122, 124, 132 and 134 designate communication connections for connection of a hydraulic or pneumatic medium. In FIG. 14b, holder elements 142 are shown for attaching the gripper device 52 to an arm. In addition, further ports 152, 154 for hydraulic or pneumatic media are provided, in order to achieve further degrees of freedom of movement, such as pivoting of the guide elements 62 as a whole, or also linear displacements.

Figure 15B:
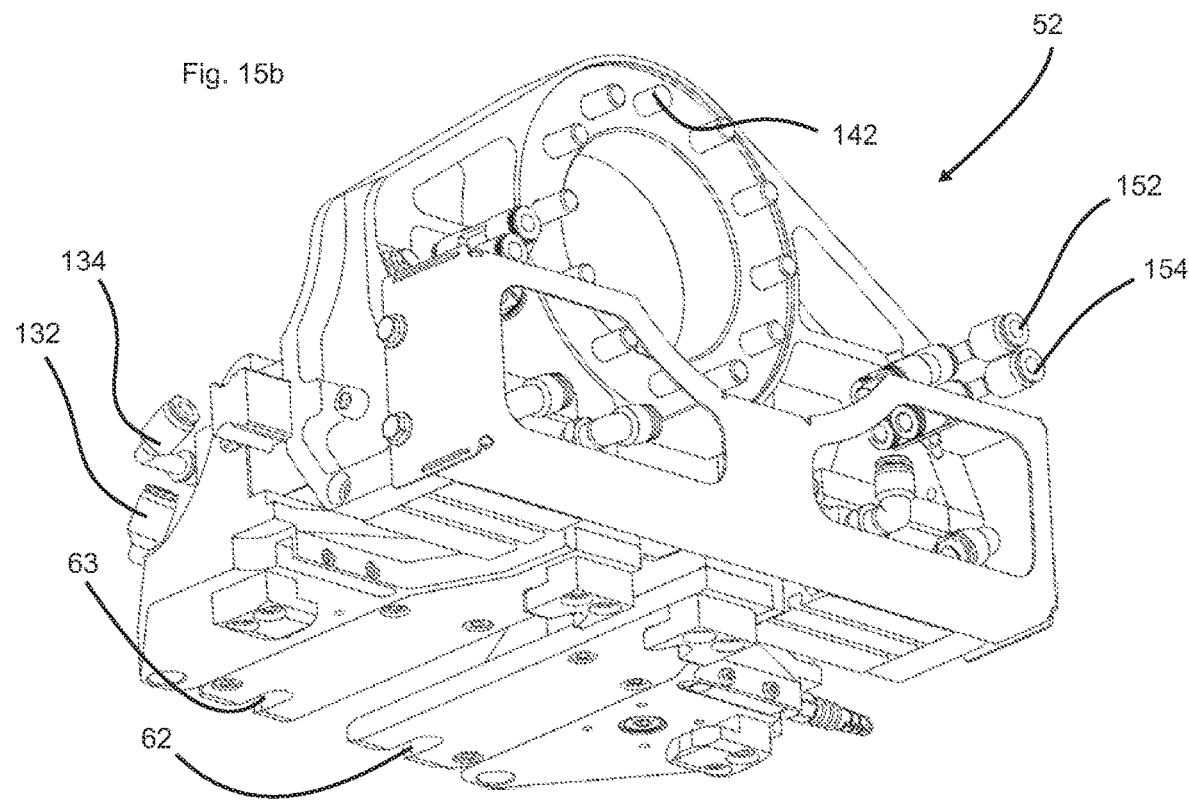

In the embodiment shown in FIGS. 15a and 15b, the guide elements 62 are separated or moved apart from each other. Accordingly, the side parts—the protrusions of which rest in the recesses 63—are also separated, so that now, as explained with reference to FIGS. 13a-13h, the base part can be removed from the side parts.

Thus the gripper device 52 in this embodiment allows a relative movement between the guide elements 63 or holding elements 62 which serve to hold or guide the side parts 14a, 14b of the blow-moulding device 14. Here, the two guide elements 62 are each movable in a rectilinear direction so that the side parts of the blow-moulding device can be moved apart or brought together.

Preferably, as mentioned above, the drives for performing this separation and approach movement of the side parts are pneumatic drives. Standard magazines can be used for storage of the blow-moulding devices.

FIG. 16 shows an embodiment of an apparatus according to the invention. Again, the forming device 1 with the rotatable carrier 12 is shown. In addition, a supply device 36 is provided for supplying the plastic preforms, such as in the form of a transport star, and a discharge device 38 for discharging the finished plastic containers or plastic bottles.

Reference sign S1 refers to the first protected area within which the forming device 1 is arranged. Reference sign S2 designates the second protected area within which the change device 40 is, arranged. The first protected area S1 is separated from the second protected area S2 by a separating element 160. This separating element 160 (e.g. in the form of a roller shutter) may create or interrupt a connection between the two protected areas S1 and S2. During working mode, it is conceivable that the first protected area S1 is closed and the second protected area 52 is opened.

Reference sign 140 refers to a first magazine device in which, here, a plurality of first side parts 14a and second side parts 14b of the blow-moulding devices are arranged. These side parts preferably have identification elements so that they can be dearly identified by the change device.

Reference sign 145 designates a second magazine device in which the base parts 14c of the blow-moulding devices 14 are arranged. These base parts 14c are preferably also clearly identifiable.

FIG. 17 shows a depiction of the change device 40. In this embodiment, two gripper devices 52, 53 are provided (not shown in detail), wherein both side parts 14a and 14b, together with the base part 14c, are arranged on one of the gripper devices 52. Thus the entire blow-moulding device 14 is arranged on the gripper device.

Only the two side parts 14a and 14b are arranged on the second gripper device 53. Reference sign 182 designates a holding device on which the two gripper devices are arranged. Furthermore, a carrier 184 is provided which carries the two holding devices. This carrier can be rotated about a rotation axis Dr in order to bring either the first gripper device 52 or the second gripper device 53 up to the forming stations.

Reference signs 92 and 93 each refer to identification devices which serve to identify blow-mould parts. These may for example be RFID read devices which are suitable for reading RFID tags. These identification devices are here arranged on the gripper devices but could however also be arranged on the carrier 184. Again, identification elements 150 are arranged on the individual blow-mould parts 14a, 14b, 14c and allow clear identification of the individual blow-moulding devices. These again could for example be RFID tags or similar.

The apparatus preferably also has a memory device (not shown) in which the entered data, such as data characterising the blow-moulding devices, can be stored.

It would be possible for such data which characterises the blow-moulding devices to be stored together with positional data of the gripper device, so that it can be established at which site (e.g. within a magazine) a specific blow-moulding device is located.

In the embodiment shown in FIG. 18, two gripper devices 52, 53 are again provided wherein however here one gripper device 52 serves for gripping the two side parts 14a and 14b of the blow-moulding device, and the other gripper device 53 serves for holding only one blow mould. As stated however, each of the two gripper devices 52, 53 could be used optionally to grip only the side parts, to grip only a base part, or to grip an entire blow-moulding device with two side parts and a base part.

The applicant reserves the right to claim as essential to the invention all features disclosed in the application documents insofar as these are novel individually or in combination relative to the prior art. It is furthermore pointed out that features have been described in the individual figures which may be advantageous taken in themselves. The person skilled in the art will directly understand that a specific feature described in one figure could also be advantageous even without further features from this figure. The person skilled in the art will also understand that advantages may result from a combination of several features shown individually or in different figures.

LIST OF REFERENCE SIGNS

1 Apparatus forming apparatus
6 Base carrier
8 Forming stations
10 Plastic preforms
12 Station carrier
14 Blow-moulding device
14a, 14b Side parts of blow-moulding device 14c Base part of blow-moulding device
15 Blow-mould shell
15a Supply and discharge element for tempering medium
16 Blow-mould carrier
16a 16b Blow-mould carrier parts
18 Housing
18a Recess
20 Plastic containers
22 Control device for controlling the change device
32 Wall
34 Wall parts
36 Supply device
38 Discharge device
40 Change device
40a-40d Change device
42 Control device for controlling the forming device
46 Detection device
50 Oven
52 Gripper device
53 Gripper device
54 Second pivotable arm
56 First pivotable arm
58 Carrier
62 Guide element
63 Recess
64a, 64b Protrusions
66 Protrusions
70 Magazine device
72 Holes
74 Carrier/pallet
75 Carrier plate
77 Openings
78 Carrier
79 Base carrier
79a Openings/holes
82 Locking device
120,130 Drives
140,145 Magazine
122, 124 Communication connections
132, 134 Communication connections
142, 154 Ports
158 identification element
160 Separating element
172,174 Side parts
176 Base part
182 Holder device
184 Carrier
192, 193 identification device
D Rotation axis
Dr Rotation axis of gripper devices
B Operator
A1-A6 Axes
W Change position
R Radial direction
S1 First protected area
S2 Second protected area

The invention claimed is:

1. Method for operating a forming device of an apparatus for forming plastic preforms into plastic containers, wherein in a working mode of the apparatus, the plastic preforms are transported by means of a plurality of forming stations along a predefined transport path, and by loading with a fluid medium are expanded into plastic containers, wherein to expand the plastic preform, blow-moulding devices are used, inside which the plastic preforms are expanded into plastic containers, wherein in a change mode, at least one of the blow-moulding devices is removed from the apparatus and/or one of the blow-moulding devices is arranged on a blow-mould carrier of the apparatus, wherein to change the blow-moulding devices, a change device is used which has a gripper device for gripping the blow-moulding device,
wherein in a working mode, the forming device is operated in a first protected area which is not accessible to a machine operator during production, and the change device is arranged at least partially in a second protected area which is accessible for the machine operator for at least part of the time in the working mode, wherein a connection can be created between the first protected area and the second protected area, and
wherein during the working mode, preparatory processes for a change process are performed in the second protected area and the second protected area is an actual housing or a light barrier, wherein the second protected area being accessible for the machine operator includes permitting the machine operator to enter the second protected area, wherein a preparation of the preparatory processes includes a provision of blow-moulding devices to be inserted, or a detection of blow-moulding devices and during the change process new blow-moulding devices or the blow-moulding devices to be inserted are brought to at least one of the plurality of the forming stations, and wherein a magazine device is provided which has a plurality of receiving holes for receiving the blow-moulding devices and the blow-moulding devices are each introduced into the receiving holes.

2. Method according to claim 1, wherein in working mode, the connection between the first protected area and the second protected area is interrupted.

3. Method according to claim 1, wherein during the change process, the two protected areas are connected together for at least part of the time such that the first protected area can be reached by the change device for at least part of the time.

4. Method according to claim 1, wherein a receiver device containing a plurality of blow-moulding devices is moved into a working area of the change device.

5. Method according to claim 1, wherein before or during the change process, blow-moulding parts are identified.

6. Method according to claim 5, wherein blow-moulding parts are identified in order to assign these blow-moulding parts to predefined forming stations.

7. Method according to claim 5, wherein before or during the change process, data characteristic of their position are assigned to the blow-moulding parts identified or to be identified.

8. Method according to claim 1, wherein the change process comprises the following steps:
opening of the second protected area;
introduction of a receiver device with a plurality of blow-moulding parts;
identification of at least some of the blow-moulding parts introduced.

9. Apparatus for forming plastic preforms into plastic containers, with a transport device which transports the plastic preforms along a predefined transport path, wherein the transport device has a movable station carrier arranged at least indirectly on a stationary base carrier and on which a plurality of forming stations are arranged, wherein these forming stations each comprise blow-moulding devices which each form cavities within which the plastic preforms can be formed into plastic containers, and these blow-moulding devices are each arranged on blow-mould carriers, wherein the apparatus has a change device which is suitable and intended at least to remove the blow-moulding devices from their blow-mould carriers and/or arrange blow-moulding devices on the blow-mould carriers, wherein this change device comprises a gripper device for gripping the blow-moulding device, wherein the apparatus has a first protected area within which the forming device is operated, and wherein the apparatus has a second protected area within which the change device is at least partially arranged, and the first protected area and the second protected area can be made accessible independently of each other, including permitting a machine operator to enter the second protected area, and the second protected area is brought into connection with the first protected area, and wherein during a working mode, the apparatus performs preparatory processes for a change process in the second protected area and the second protected area is an actual housing or a light barrier, wherein a preparation of the preparatory processes includes a provision of blow-moulding devices to be inserted, or a detection of blow-moulding devices and during the change process new blow-moulding devices or the blow-moulding devices to be inserted are brought to at least one of the plurality of forming stations, and wherein a magazine device is provided which has a plurality of receiving holes for receiving the blow-moulding devices and the blow-moulding devices are each introduced into the receiving holes.

10. Apparatus according to claim 9, wherein the first protected area and the second protected area can be connected together via an interface, wherein this interface also allows interruption of the connection.

11. Apparatus according to claim 9, wherein in the working mode of the apparatus, the change device is completely arranged in the second protected area.

12. Apparatus according to claim 1, wherein the change device has at least two gripper devices.

13. Apparatus according to claim 12, wherein one gripper device serves for gripping the two side parts of the blow-moulding device and the other gripping device serves for holding the base part.

14. Apparatus according to claim 12, wherein the at least two gripper devices are arranged on a common rotatable and/or pivotable carrier.

15. Apparatus according to claim 9, wherein the side parts and the base part of the blow-moulding device are removed in temporal succession.

16. Method for operating a forming device of an apparatus for forming plastic preforms into plastic containers, wherein in a working mode of the apparatus, the plastic preforms are transported by means of a plurality of forming stations along a predefined transport path, and by loading with a fluid medium are expanded into plastic containers, wherein to expand the plastic preforms, blow-moulding devices are used, inside which the plastic preforms are expanded into plastic containers, wherein in a change mode, at least one of the blow-moulding devices is removed from the apparatus and/or one of the blow-moulding devices is arranged on a blow-mould carrier of the apparatus, wherein to change the blow-moulding devices, a change device is used which has a gripper device for gripping the blow-moulding device, wherein in a working mode, the forming device is operated in a first protected area which is not accessible to a machine operator during production, and the change device is arranged at least partially in a second protected area which is accessible for the machine operator for at least part of the time in the working mode, wherein a connection can be created between the first protected area and the second protected area, wherein during the working mode, preparatory processes for a change process are performed in the second protected area and the second area is an actual housing or a light barrier, wherein access to the second protected area includes entering the second protected area, wherein a preparation of the preparatory processes includes a provision of blow-moulding devices to be inserted, or a detection of blow-moulding devices and during the change process new blow-moulding devices or the blow-moulding devices to be inserted are brought to at least one of the plurality of the forming stations, and two control devices including a control device for controlling the change device and a control device for controlling the forming device are provided, wherein the two control devices interact for a change mode for exchange of blow-moulding devices and in a normal working mode, the change device of the apparatus proceeds into a rest position in which the change device consumes a minimum amount of space.

* * * * *